US012123406B2

(12) United States Patent
Arefi

(10) Patent No.: US 12,123,406 B2
(45) Date of Patent: Oct. 22, 2024

(54) GEOTHERMAL PROCESSES AND SYSTEMS FOR ENHANCING ELECTRICITY GENERATION VIA INCREASING A PRESSURE ON A PRIMARY FLUID

(71) Applicant: Babak Bob Arefi, Spring, TX (US)

(72) Inventor: Babak Bob Arefi, Spring, TX (US)

(*) Notice: Subject to any disclaimer, the term of this patent is extended or adjusted under 35 U.S.C. 154(b) by 0 days.

(21) Appl. No.: 17/890,874

(22) Filed: Aug. 18, 2022

(65) Prior Publication Data
US 2023/0077091 A1    Mar. 9, 2023

Related U.S. Application Data

(60) Provisional application No. 63/234,510, filed on Aug. 18, 2021.

(51) Int. Cl.
| | |
|---|---|
| *F03G 4/00* | (2006.01) |
| *F24T 10/30* | (2018.01) |
| *F24T 50/00* | (2018.01) |

(52) U.S. Cl.
CPC ............. *F03G 4/001* (2021.08); *F03G 4/033* (2021.08); *F03G 4/037* (2021.08); *F24T 10/30* (2018.05); *F24T 50/00* (2018.05)

(58) Field of Classification Search
CPC .......... F03G 4/001; F03G 4/033; F03G 4/037; F24T 10/30; F24T 50/00
USPC .............................................. 60/641.2–641.4
See application file for complete search history.

(56) References Cited

U.S. PATENT DOCUMENTS

| | | | | |
|---|---|---|---|---|
| 3,898,020 | A * | 8/1975 | Matthews | F24T 10/20 417/379 |
| 4,052,857 | A * | 10/1977 | Altschuler | F24T 10/17 165/45 |
| 4,142,108 | A * | 2/1979 | Matthews | F24T 10/10 290/1 R |
| 5,970,714 | A * | 10/1999 | Bronicki | F24T 10/20 60/641.5 |
| 10,794,160 | B2 * | 10/2020 | Takahashi | E21B 43/00 |
| 2006/0137349 | A1 * | 6/2006 | Pflanz | F28D 20/0052 60/641.2 |
| 2007/0223999 | A1 * | 9/2007 | Curlett | F24T 10/20 405/55 |
| 2009/0107143 | A1 * | 4/2009 | Zachar | F02C 1/007 60/659 |

(Continued)

*Primary Examiner* — Hoang M Nguyen

(74) *Attorney, Agent, or Firm* — McCutcheon Joseph, PLLC

(57) ABSTRACT

A geothermal process for generating electricity includes: heating a primary fluid by absorbing thermal energy from a geothermal energy source to elevate thermal energy and kinetic energy of the primary fluid; increasing a pressure on the primary fluid to raise a boiling point and a temperature of the primary fluid and decrease latent heat of the primary fluid; driving a mechanical device via one of: the kinetic energy of the primary fluid; and a kinetic energy of a secondary working fluid that absorbs the thermal energy of the primary fluid in a heat exchanger; and driving an electricity generator by the mechanical device to generate electricity. The pressure on the primary fluid may be increased by restricting, a flow path of the primary fluid to create a backpressure, by increasing a density of the primary fluid, or by increasing a pumping pressure of the primary fluid into the geothermal well.

20 Claims, 10 Drawing Sheets

(56) References Cited

U.S. PATENT DOCUMENTS

| | | | | |
|---|---|---|---|---|
| 2010/0045042 A1* | 2/2010 | Hinders | ............... | F28D 9/0006 |
| | | | | 204/194 |
| 2010/0154417 A1* | 6/2010 | Ferguson | ................. | F03G 6/00 |
| | | | | 60/641.15 |
| 2012/0174581 A1* | 7/2012 | Vaughan | ................. | F24T 10/10 |
| | | | | 290/40 C |
| 2013/0227947 A1* | 9/2013 | Bronicki | ................. | F01K 23/04 |
| | | | | 60/671 |
| 2013/0333383 A1* | 12/2013 | Schwarck | .............. | F24T 10/10 |
| | | | | 165/45 |
| 2015/0107244 A1* | 4/2015 | Lakic | .................. | H02K 7/1823 |
| | | | | 405/52 |
| 2015/0121868 A1* | 5/2015 | Fryrear | .................... | F03G 7/04 |
| | | | | 60/641.4 |
| 2015/0168022 A1* | 6/2015 | Takata | ................... | F01K 9/003 |
| | | | | 60/671 |
| 2021/0325089 A1* | 10/2021 | Toews | .................. | E21B 36/001 |

* cited by examiner

System Wellbore/Bottomhole Pressure ≈ Hydrostatic Pressure (Fluid Density x Gravity x Depth) + Backpressure + Pump Pressure − ΔP (Pressure Loss Through System)

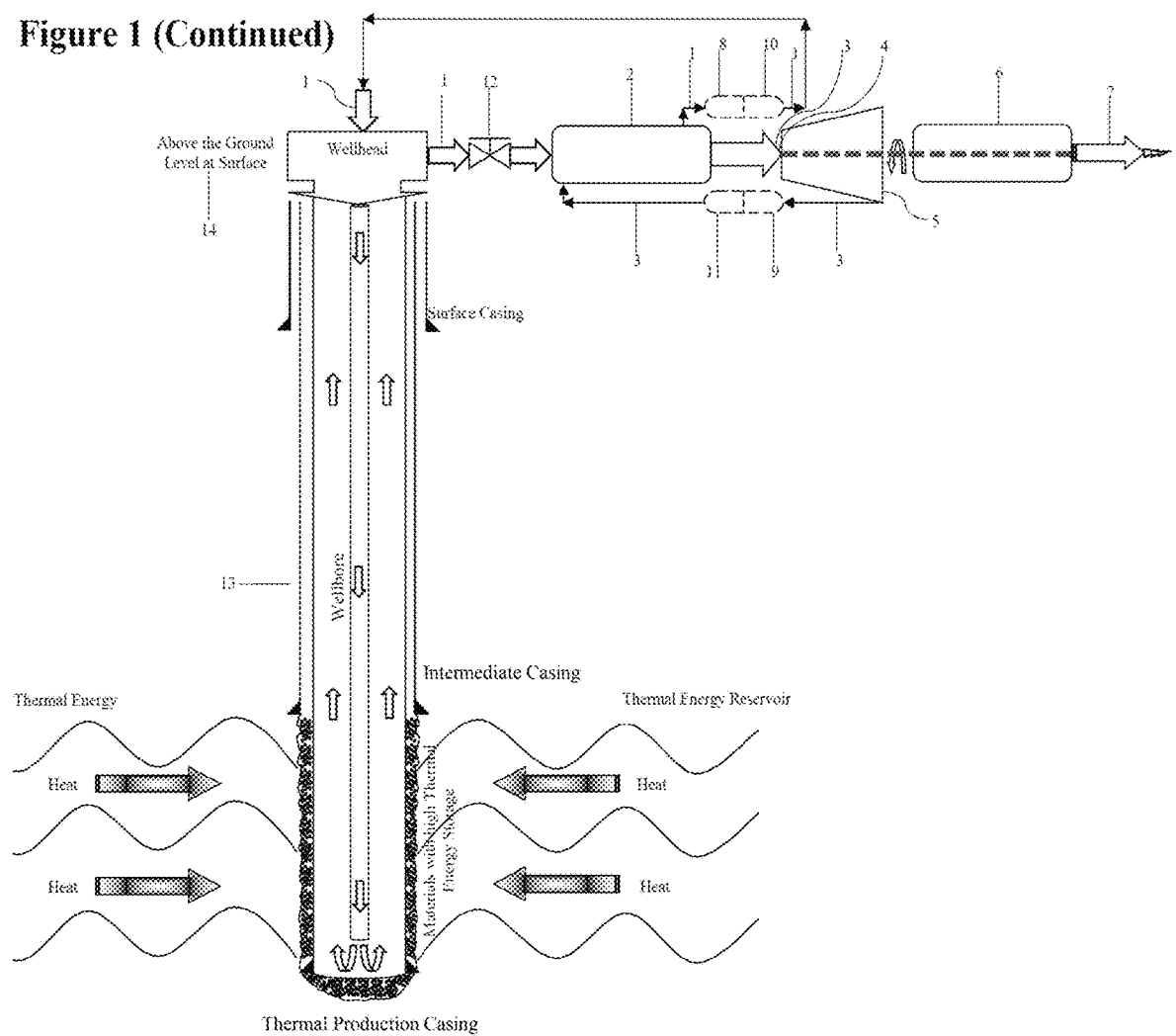

GEOTHERMAL PROCESSES AND SYSTEMS FOR ENHANCING ELECTRICITY GENERATION VIA INCREASING A PRESSURE ON A PRIMARY FLUID

CROSS REFERENCE TO RELATED APPLICATIONS

This application is a non-provisional application that claims priority to U.S. Provisional Application No. 63/234,510, filed on Aug. 18, 2021. The disclosure of the prior application is hereby incorporated by reference herein in its entirety.

TECHNICAL FIELD

The present disclosure relates to geothermal processes and systems which utilize a geothermal energy source to generate electricity. In particular, the present disclosure relates to geothermal processes and systems that enhance the amount of electricity generation by increasing a pressure on the primary fluid.

BACKGROUND

Geothermal energy systems extract heat from a geothermal energy source in an underground geologic formation, such as a hot rock reservoir. In a typical geothermal energy system, a fluid is pumped down into an underground rock formation to transfer thermal energy of the rock formation to the surface. At the surface, the heated fluid is utilized in a process that drives a turbine and an electrical generator to produce electrical power, and then the fluid may be pumped back into the underground formation to repeat the cycle.

SUMMARY

Known geothermal systems pump fluid into a well to reach a geothermal energy source without any consideration for improving the thermodynamic conditions in the well. There have not heretofore been endeavors to manipulate the thermodynamic conditions in the well to enable a primary fluid to maximize heat transfer from the geothermal energy source. There can be a significant amount of thermal energy loss of a primary as the fluid travels in the well from the thermal energy source to electricity generating components. This is because the thermal energy in the fluid may be conducted and/or radiated to the well or the surrounding environment. The loss of thermal energy reduces the amount the kinetic energy of the primary fluid, and hence the potency in which the fluid can drive the turbine or the amount of thermal energy transferred to a secondary working fluid to drive the turbine via kinetic energy. Driving the turbine with less kinetic energy decreases the amount of electromagnetic induction in the electricity generator, and as a result the amount of electricity produced by the electricity generator decreases. The loss of thermal energy of the primary fluid thus reduces the efficiency of the geothermal energy system.

The present disclosure describes geothermal energy processes and systems that manipulate the thermodynamic conditions in a geothermal well by increasing the pressure on the primary fluid. Increasing the pressure of the primary fluid raises the temperature and the boiling point of the primary fluid, which causes the primary fluid in a binary geothermal energy system to enter a heat exchanger with higher temperature. The higher temperature results in more heat transfer to a secondary working fluid in the heat exchanger to raise the temperature and kinetic energy of the secondary working fluid that is used as work to run a turbine that drives an electricity generator. In a "single fluid" geothermal energy system, the increased temperature and the boiling point of the primary fluid caused by increasing the pressure on the primary fluid provides the primary fluid with more kinetic energy to do the work that drives the turbine. The raised temperature and boiling point reduce the latent heat of the primary fluid. The heat loss due to movement of the primary fluid from the geothermal energy source to the surface of the geothermal well should not be more than the latent heat of the primary fluid, in order to maintain the higher temperature of the primary fluid either entering the heat exchanger (binary system) or driving the turbine ("single fluid" system). As a result, the primary fluid can maximize heat transfer to a secondary working fluid or to a turbine that drives an electricity generator to generate electricity. More heat transfer increases the kinetic energy used to drive the turbine, and thus the electricity generator, to increase the amount of generated electricity. Increasing a pressure on the primary fluid can thus increase the production and efficiency of the geothermal energy system. The present disclosure thus provides systems and processes for generating electricity from a geothermal energy source that are improvements over known systems and processes for generating electricity.

In one embodiment, a geothermal process for generating electricity comprises heating a primary fluid by absorbing thermal energy from a geothermal energy source to elevate thermal energy and kinetic energy of the primary fluid; increasing a pressure on the primary fluid to raise a boiling point and a temperature of the primary fluid and decrease latent heat of the primary fluid; driving a mechanical device via one of: the kinetic energy of the primary fluid; and a kinetic energy of a secondary working fluid that absorbs the thermal energy of the primary fluid in a heat exchanger; and driving an electricity generator by the mechanical device to generate electricity.

In an embodiment, the pressure on the primary fluid is increased by restricting a flow path of the primary fluid to create a backpressure in the geothermal well.

In an embodiment, the restricting is caused by one of a choke and a valve.

In an embodiment, the pressure on the primary fluid is increased by increasing a density of the primary fluid.

In an embodiment, increasing the density of the primary fluid increases hydrostatic pressure of the primary fluid.

In an embodiment, the density of the primary fluid is increased by adding a substance to the primary fluid.

In an embodiment, the substance is a weighting additive including at least one of: Barite, Hematite, Ilmenite, and MICROMAX (trimanganese tetroxide).

In an embodiment, the pressure on the primary fluid is increased by increasing a pumping pressure of the primary fluid into the geothermal well.

In an embodiment, one of the primary fluid and the secondary working fluid is in a supercritical state when driving the mechanical device.

In another embodiment, a geothermal system for generating electricity comprises: a primary fluid that absorbs thermal energy from a geothermal energy source to elevate thermal energy and kinetic energy of the primary fluid; means for increasing a pressure on the primary fluid to raise a boiling point and a temperature of the primary fluid and decrease latent heat of the primary fluid; a mechanical device that is driven by one of: the kinetic energy of the primary fluid; and a kinetic energy of a secondary working fluid that absorbs the thermal energy of the primary fluid in a heat exchanger; and an electricity generator that is driven by the mechanical device to generate electricity.

In an embodiment, the means for increasing the pressure on the primary fluid is a restriction in a flow path of the primary fluid from the geothermal energy source to create a backpressure in the geothermal well.

In an embodiment, the restriction is one of a choke and a valve.

In an embodiment, the means for increasing the pressure on the primary fluid is a substance added to the primary fluid to increase a density of the primary fluid and a hydrostatic pressure of the primary fluid.

In an embodiment, the means for increasing the pressure on the primary fluid is a pump that increases a pumping pressure of the primary fluid into the geothermal well.

In an embodiment, one of the primary fluid and the secondary working fluid is in a supercritical state when driving the mechanical device.

BRIEF DESCRIPTION OF THE FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein.

DETAILED DESCRIPTION

Figure 1:
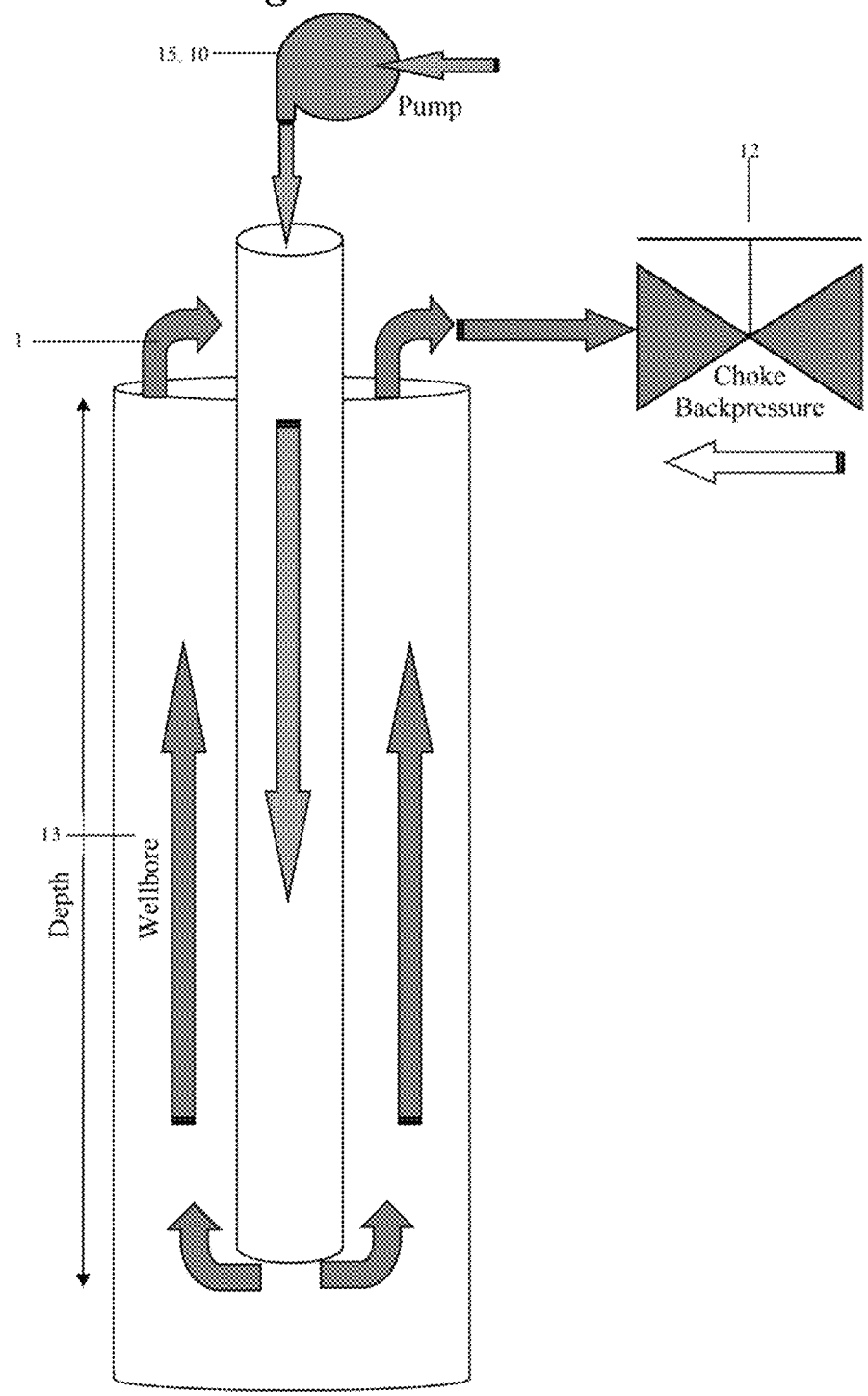
FIG. 1 is a schematic illustration of a geothermal energy system according to a first embodiment.

While processes, systems and devices are described herein by way of examples and embodiments, those skilled in the art recognize the processes, systems and devices are not limited to the embodiments or drawings described. It should be understood that the drawings and description are not intended to be limited to the particular form disclosed. Rather, the intention is to cover all modifications, equivalents and alternatives falling within the spirit and scope of the appended claims and description. Any headings used herein are for organization purposes only and are not meant to limit the scope of the description of the claims. As used herein, the word "may" is used in a permissive sense (i.e., meaning having the potential to) rather than the mandatory sense (i.e., meaning must). Similarly, the words "include," "including," and "includes" mean including, but not limited to. The present disclosure describes particular embodiments and with reference to certain drawings, but the subject matter is not limited thereto.

The present disclosure will provide description to the accompanying drawings, in which some, but not all embodiments of the subject matter of the disclosure are shown. Indeed, the subject matter may be embodied in many different forms and should not be construed as limited to the embodiments set forth herein, rather, these embodiments are provided so that this disclosure satisfies all the legal requirements. The disclosure herein is illustrative and explanatory of one or more embodiments and variations thereof, and it will be appreciated that various changes in the design, organization, means of operation, structures and location, methodology, and use of mechanical equivalents may be made without departing from the spirit of the invention. Because many varying and different embodiments may be made within the scope of the concept(s) herein taught, and because many modifications may be made in the embodiments described herein, it is to be understood that the details herein are to be interpreted as illustrative and non-limiting.

Certain terminology is used in the following description for convenience only and is not limiting. Certain words used herein designate directions in the drawings to which reference is made. Unless specifically set forth herein, the terms "a," "an" and "the" are not limited to one element, but instead should be read consistent with the meaning of "one or more," "at least one," and "one or more than one." As used herein "another" means at least a second or more. The terminology includes the words noted above, derivatives thereof and words of similar import.

Use of the term "about", when used with a numerical value, is intended to include +/−10%. For example, if a number of amino acids is identified as about 200, this would include 180 to 220 (plus or minus 10%). Similarly, use of the term "approximately", when used with a numerical value, is intended to include +/−10%. For example, if a number of amino acids is identified as approximately 200, this would include 180 to 220 (plus or minus 10%).

Unless otherwise defined, all technical and scientific terms used herein have the same meaning as commonly understood by one of ordinary skill in the art.

FIG. 1 illustrates one embodiment of a geothermal energy system that can be used with a geothermal energy source in a well 13 to generate electricity. The geothermal system may include a heat exchanger 2 at the surface 14 that receives a primary fluid 1 from a geothermal well 13. The surface 14 may be the surface of the earth. In the geothermal well 13, at least some portion of thermal energy from the geothermal energy source is transferred as heat to the primary fluid 1 by heat exchange. The geothermal energy source may include, but is not limited to hot rock formations and reservoirs in underground geologic formations. The primary fluid 1 absorbs the thermal energy from the geothermal energy source. That is, the geothermal energy source transfers thermal energy (i.e., heat) to raise the temperature of the primary fluid 1. The transferred heat from the geothermal energy source can elevate the kinetic energy of the primary fluid 1 so that the heated primary fluid 1 may have a relatively high temperature and pressure. The thermal energy may be derived from the motion and vibration of molecules of the geothermal energy source.

The heat exchanger 2 transfers the thermal energy of the primary fluid 1 to a secondary working fluid 3. In the present disclosure, a heat exchanger 2 can be any mechanical device that transfers thermal energy from one substance (e.g., a higher thermal energy fluid) to another substance (e.g., a lower thermal energy fluid) via "conduction", "convection" and/or "radiation". As a non-limiting example, a shell and tube heat exchanger may be implemented with the geothermal system discussed herein. FIG. 1 thus illustrates a "binary system" involving two fluids: (i) a primary fluid 1 that is heated by absorbing thermal energy from the geothermal energy source in the well 13 to produce a heated primary fluid 1; and secondary working fluid 3 that absorbs the thermal energy (heat) from the primary fluid 1 in the heat exchanger 2. Upon absorbing the thermal energy (heat) in the heat exchanger 2, the secondary working fluid 3 may increase its temperature, volume and pressure, and thus its enthalpy, and may change its phase/state from a liquid to a gas/vapor. The secondary working fluid 3 may also be heated to the extent that the secondary working fluid 3 reaches a supercritical state. The structure of the heat exchanger 2 is not limited in the present disclosure to any particular design or configuration, so long as the heat exchanger 2 is operable to transfer heat from the thermal energy source to a working fluid (e.g., from a heated primary fluid 1 to a secondary working fluid 3). As examples, the heat exchanger 2 may be a finned tube heat exchanger, a shell and tube heat exchanger, or a plate heat exchanger. Other types of heat exchangers not listed here that may be used to transfer heat to the secondary working fluid 3 are within the scope of this invention. The heated secondary working fluid 3 is then directed from the heat exchanger 2 towards a turbine 5. In some instances, the heated secondary working fluid 3 may be considered as a kinetic energy fluid by virtue of its molecular movement to drive the turbine 5. The primary fluid 1 may also be considered as a kinetic energy fluid by virtue of its molecular movement.

The heated secondary working fluid 3 (e.g., having a high pressure and high temperature) flows from the heat exchanger 2 into the turbine 5. In one embodiment, the turbine 5 may include a series of blades mounted on a shaft. As the heated secondary working fluid 3, preferably in the supercritical gas state/phase, enters the turbine 5, its kinetic energy will exert a force to move the series of blades on the shaft. The force turns the blades, which rotates the shaft to drive the turbine 5. In the present disclosure, a turbine 5 is any mechanical device that performs work by using the kinetic energy of a fluid (e.g., the secondary working fluid 3 in a "binary" system, or a working fluid in a "single fluid" system). That is, a turbine may be a mechanical device or equipment that transfers kinetic energy to mechanical energy to perform work. Some examples of such mechanical devices include: a turbine having a series of blades on the shaft as discussed above; and a piston with a crankshaft that is turned by the kinetic energy. For instance, engines may include piston with a crankshaft. The shaft may be connected to the rotor of an electricity generator 6 (discussed below). The turbine 5 or other mechanical device, in turn, drives an electricity generator 6 to generate electricity 7 via electromagnetic induction. When used herein, the term "turbine" is mean to encompass the turbine 5 as discussed above or other mechanical devices that may include a shaft that is turned by kinetic energy and/or mechanical energy of a working fluid, such as an engine with a piston and a crankshaft that may be turned by kinetic energy and/or mechanical energy of a working fluid.

The turbine 5 or other mechanical device, in turn, drives an electricity generator 6 to generate electricity 7 via electromagnetic induction. In the present disclosure, the electricity generator 6 is any mechanical/electrical, device that changes kinetic energy to electrical energy. In one embodiment, the electricity generator 6 includes a rotor that is connected to the shaft of the turbine 5 (or, crankshaft of an engine) so as to rotate with rotation of the shaft. The rotor of the electricity generator 6 may include a coil of copper wire (armature) that rotates in response to rotation of the shaft of the turbine 5. Two polar field magnets on either side of the armature create a magnetic field inside the in the electricity generator 6. As the rotor, shaft, and armature rotate, they move within the electric field created by the magnets. As the turbine 5 rotates the armature through the magnetic field, an electrical current is created within the copper coil of the armature. This process, of generating electrical current is known as electromagnetic induction. The electricity 7 produced can be extracted from the electricity generator 6, and may be sent to an electrical grid for commercial distribution and use. In this regard, the frequency of the electricity 7 from the electricity generator 6 can be adjusted to the grid-line frequency of the grid to synchronize the transmission. The faster the electricity generator 6 is driven, the more electricity 7 it can produce.

Two main factors for having a significant amount of kinetic energy entering the turbine 5 can be a supercritical state of the fluid and the flow rate of the fluid. A fluid in the supercritical state will have higher kinetic energy, and thus and create more work. A higher flowrate of the fluid will also create more work due to its higher magnitude of impact on the blades of the turbine 5. More work has the potential to subsequently generate more electricity. In this regard, the geothermal energy system may optionally include a nozzle 4 provided between the heat exchanger 2 and the turbine 5, so that the high pressure and temperature secondary working fluid 3 passes through the nozzle 4 before entering the turbine 5. The nozzle 4 provides a restriction in the path of the heated secondary working fluid 3 in order to transfer some of the pressure of the heated primary fluid 3 to velocity, and thus expand the volume of the heated primary fluid 3. The nozzle 4 may be a fixed restriction in the path of the heated primary fluid 3, or may be an adjustable expansion valve that can be controlled, e.g., electronically or manually, to adjust the size of the restriction based on system conditions, a desired temperature and/or pressure of the heated primary fluid 3, or other considerations.

The pressure of the heated secondary working fluid 3 after driving the turbine 5 is reduced, such that the heated secondary working fluid 3 exiting the turbine 5 is in a low pressure, high temperature state, in this state, the heated secondary working fluid 3 may be conveyed to a condenser 9 to reduce the temperature of the heated secondary working fluid 3. In the present disclosure, a condenser is any mechanical device that lowers temperature of a fluid, such as by exchanging heat with ambient air in the condenser 9. In some embodiments, the condenser 9 may not be required, and may be omitted. Reducing the temperature of the heated secondary working fluid 3 is beneficial because a lower (cooler) temperature allows the secondary working fluid 3 to subsequently absorb more heat from the thermal energy of the primary fluid 1 in the heat exchanger 2 and thus increases the efficiency in reusing the secondary working fluid 3 in a cyclic thermodynamic process. In an embodiment, the condenser 9 exchanges or extracts the heat of the high temperature secondary working fluid 3 (which may be in a superheated gas/vapor phase) with the ambient temperature of the air in the condenser 9 which causes the secondary working fluid 3 to cool. Thus, the secondary working fluid 3 exiting the condenser 9 may have a decreased temperature along with the decreased pressure. The secondary working fluid 3 having a decreased temperature and pressure may be conveyed back into the geothermal system to be reheated by the primary fluid 1 in the heat exchanger 2 and used again in the energy generating process. The process of generating electricity 7 from the geothermal energy source described above may then be repeated in a repetitive, cyclic manner to continually generate electricity 7 (e.g., green energy).

In the embodiment of FIG. 1, the primary fluid 1 after exchanging thermal energy with the secondary working fluid 3 in the heat exchanger 2 may be conveyed back into the geothermal well 13 to again absorb thermal energy from the geothermal energy in the manner discussed above, and may then be recirculated through the heat exchanger 2 to exchange the thermal energy with the secondary working fluid 3 in a subsequent thermodynamic cycle. The pressure of the heated primary fluid 1 exiting the heat exchanger 2 after exchanging thermal energy with the secondary working fluid 3 may be reduced, such that the heated primary fluid 1 may be in a low pressure, high temperature state. In this state, the heated primary fluid 1 may optionally be conveyed to a condenser 8 to reduce the temperature of the heated primary fluid 1 (in some embodiments, the condenser 8 may not be required, and may be omitted). Reducing the temperature of the heated primary fluid 1 can be beneficial because a lower (cooler) temperature allows the primary fluid 1 to subsequently absorb more heat from the thermal energy source in the geothermal well 13. Absorbing more beat from the thermal energy source increases the efficiency in reusing the primary fluid 1 in a cyclic thermodynamic process. In an embodiment, the condenser 8 exchanges or extracts the heat of the high temperature primary fluid 1 with the ambient temperature of the air in the condenser 8, which causes the primary fluid 1 to cool. Thus, the primary fluid 1 exiting the condenser 8 may have a decreased temperature along with the decreased pressure.

The geothermal energy system of FIG. 1 further includes a restriction 12 in a flow path of the primary fluid 1 from the geothermal well 13 to the heat exchanger 2. In one embodiment, the restriction is a choke in the flow path of the primary fluid 1, i.e., a constriction or smaller diameter section of a flowline or pipe for conveying the primary fluid 1. The restriction 12 reduces the rate of flow of the primary fluid 1 from the geothermal energy source to the heat exchanger 2. In another embodiment, the restriction is a valve that may be manually or, electronically controlled to regulate the flow of the primary fluid 1 from the geothermal well 13 to the heat exchanger 2. The valve may be controlled to open, close or reduce the passage in a flowline or pipe that, conveys the primary fluid 1. The restriction 12 in the flow path of the primary fluid 1 from the geothermal well 13 creates a backpressure in the well 13, which in turn increases a pressure on the primary fluid 1. The increase in pressure on the primary fluid 1 raises the boiling point and the temperature of the primary fluid 1. The increased boiling point and temperature of the primary fluid 1 enable the primary fluid 1 to enter the heat exchanger 2 with a higher temperature, which results in more heat transfer to the secondary working fluid 3 in the heat exchanger 2 to raise the temperature and kinetic energy of the secondary working fluid 3. Also, the latent heat of the primary fluid 1 may be decreased by the increased boiling point and temperature of the primary fluid 1. The heat loss due to movement of the primary fluid 1 from the geothermal energy source to the surface 14 of the well 13 should not be more than the latent heat of the primary fluid 1, in order to maintain the higher temperature of the primary fluid 1 entering the heat exchanger 2. As a result, the primary fluid 1 can maximize heat transfer to the secondary working fluid 3. More heat transfer to the secondary working fluid 3 increases the kinetic energy of the secondary working fluid 3, so that the turbine 5 or other mechanical that is driven by the kinetic energy can drive the electricity generator 6 faster to increase the amount of electromagnetic induction and, hence the generated electricity 7. Increasing a pressure on the primary fluid 1 can thus increase the production and efficiency of the geothermal energy system. Accordingly, increasing the pressure on the primary fluid 1 can manipulate the thermodynamic conditions in the well 13 to enable the primary fluid 1 to maximize heat transfer to the secondary working fluid 3.

In another embodiment, the pressure on the primary fluid 1 may be increased by providing a pump 15 that pumps or increases a pumping pressure of the primary fluid 1 into the geothermal well 13. The pump 15 may be provided in the geothermal system in addition to, or as an alternative to, the restriction 12. In the present disclosure, a pump 15 is any mechanical device that moves a fluid(s) by mechanical action, typically converted from electrical energy into hydraulic energy. The pump 15 may be, for example, a direct lift pump, a displacement pump, or a centrifugal pump, although the present disclosure is not limited to any one type of pump. Any device that can be used to move the primary fluid 1 and increase a pumping pressure of the primary fluid 1 is within the scope of the present disclosure. Increasing the pumping pressure of the primary fluid 1 into the geothermal well 13 increases the backpressure in the well 13 and the pressure of the primary fluid 1. As discussed above, the increase in pressure raises the boiling point and the temperature of the primary fluid 1. The increased boiling point and temperature of the primary fluid 1 enable the primary fluid 1 to enter the heat exchanger 2 with a higher temperature, which results in more heat transfer to the secondary working fluid 3 in the heat exchanger 2 to raise the temperature and kinetic energy of the secondary working fluid 3. Also, the latent heat of the primary fluid 1 may be decreased by the increased boiling point and temperature of the primary fluid 1. The heat loss due to movement of the primary fluid 1 from the geothermal energy source to the surface 14 of the well 13 should not be more than the latent heat of the primary fluid 1, in order to maintain the higher temperature of the primary fluid 1 entering the heat exchanger 2. As a result, the primary fluid 1 can maximize heat transfer to the secondary working fluid 3. More heat transfer to the secondary working fluid 3 increases the kinetic energy of the secondary working fluid 3, so that the turbine 5 or other mechanical that is driven by the kinetic energy can drive the electricity generator 6 faster to increase the amount of electromagnetic induction and, hence the generated electricity 7. Increasing a pressure on the primary fluid 1 can thus increase the production and efficiency of the geothermal energy system. Accordingly, increasing the pressure on the primary fluid 1 can manipulate the thermodynamic conditions in the well 13 to enable the primary fluid 1 to maximize heat transfer to the secondary working fluid 3.

In a further embodiment, the pressure on the primary fluid 1 may be increased by increasing the density of the primary fluid 1. The density of the primary fluid 1 can be increased by adding a substance (not shown) to the primary fluid 1. increasing the density of the primary fluid 1 to increase the hydrostatic pressure of the primary fluid 1 in the geothermal system may be done in addition to, or as an alternative to, the restriction 12 and/or the pump 15. The substance added to the primary fluid 1 may one or more "weighting" additives or agents, such as Barite, Hematite, Ilmenite, and/or MICROMAX (trimanganese tetroxide). Barite is barium sulfate ($BaSO_4$). Other "weighting" additives or agents not listed here may also be used to increase the density of the primary fluid. Increasing the density of the primary fluid 1 increases the hydrostatic pressure of the primary fluid 1 in the well 13, and hence the system pressure. The increase in system pressure may cause a change in the thermodynamic conditions of the well 13. As discussed above, the increase in pressure raises the boiling point and the temperature of the primary fluid 1. The increased boiling point and temperature of the primary fluid 1 enable the primary fluid 1 to enter the heat exchanger 2 with a higher temperature, which results in more heat transfer to the secondary working fluid 3 in the heat exchanger 2 to raise the temperature and kinetic energy of the secondary working fluid 3. Also, the latent heat of the primary fluid 1 may be decreased by the increased boiling point and temperature of the primary fluid 1. The heat loss due to movement of the primary fluid 1 from the geothermal energy source to the surface 14 of the well 13 should not be more than the latent heat of the primary fluid 1, in order to maintain the higher temperature of the primary fluid 1 entering the heat exchanger 2. As a result, the primary fluid can maximize heat transfer to the secondary working fluid 3. More heat transfer to the secondary working fluid 3 increases the kinetic energy of the secondary working fluid 3, so that the turbine 5 or other mechanical that is driven by the kinetic energy can drive the electricity generator 6 faster to increase the amount of electromagnetic induction and, hence the generated electricity 7. Increasing a pressure on the primary fluid 1 can thus increase the production and efficiency of the geothermal energy system. Accordingly, increasing the pressure on the primary fluid 1 can manipulate the thermodynamic conditions in the well 13 to enable the primary fluid 1 to maximize heat transfer to the secondary working fluid 3.

The principles discussed above may be represented by the following equations:

System Wellbore Pressure=(Fluid Density×Gravity×Depth)+Backpressure+Pump Pressure−ΔP (Pressure Loss Through System)

Fluid Density×Gravity×Depth=Hydrostatic Pressure

In a given well 13 having, a geothermal energy source at a particular depth, the three variables in the above equations that can be manipulated to the increase System Wellbore Pressure, and thus obtain the beneficial thermodynamic conditions discussed above, are Fluid Density, Pressure, and Backpressure.

The geothermal energy systems discussed herein may include one or more sensors (not shown) to detect physical conditions of the primary fluid 1 and/or the well 13. The sensor(s) may be provided in the well 13, and may detect a pressure, a temperature, flow, and/or a volume of the primary fluid 1 in the well 13. The sensor(s) may also detect meteorological parameters, ground-water level and temperature, a thermal gradient profile, and well casing temperature and integrity. In the present disclosure, a sensor is any device that measures physical input from its environment and converts it into data that can be interpreted by either a human or a machine. The sensor may be an electronic sensor that converts the detected data into electronic data. The electronic sensor may be an analog sensor or a digital sensor. An analog sensor converts physical data into an analog signal, and can be more precise than a digital sensor which is limited to a finite set of possible values.

The geothermal energy systems discussed herein may further include one or more controllers not shown) to adjust the choke, valve, and/or pump based on one or more of the physical conditions detected by the sensor(s). For instance, the controller may adjust a valve to reduce the passage in the flowline of the primary fluid 1 in order to create more backpressure in well 13 if a sensor detects that the current backpressure is below a predetermined amount or threshold for raising the boiling point and the temperature the primary fluid 1. As another example, the controller may adjust a pumping rate of the pump 15 to increase increases the pumping pressure of the primary fluid 1 into the well 13 if a sensor detects that the current pumping pressure is below a predetermined amount or threshold for raising the boiling point and the temperature the primary fluid 1. The controllers may be software that is executed by a computer program stored on a non-transitory computer readable recording medium, such as write/readable and read-only memory devices within a computer, including a read-only memory and a flash memory. Other examples of non-transitory computer readable recording mediums include a CD-ROM disk readable by a CD-ROM drive, a hard-disk drive, and portable storage devices that may be connected to a computer via a USB port. The computer program may contain codes and instructions that are executed on a computer to make the controller(s) perform functions. Thus, the controller(s) can be mechanized and automated. In other embodiments, the valve and/or pump 15 may be controlled manually. Further, the process of adding a substance to the primary fluid 1 to increase the density of the primary fluid 1 may be automated or performed manually based on the physical condition(s) sensed by the sensor(s).

Figure 2A:
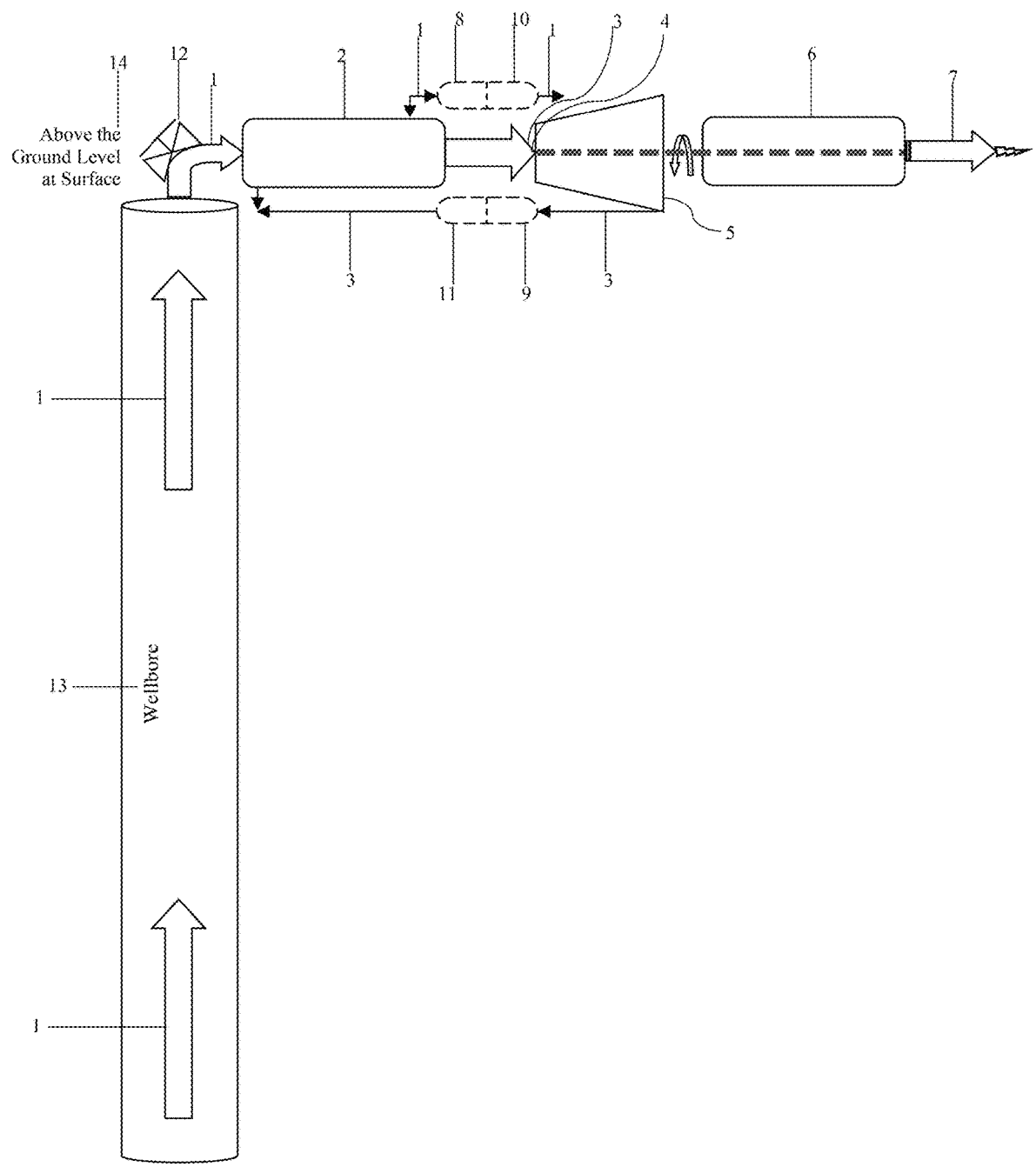
FIG. 2A is a schematic illustration of a geothermal energy system according to a second embodiment.

FIG. 2A illustrates a second embodiment of geothermal energy system for generating electricity. The geothermal energy system in FIG. 2A is similar to the one described above with respect to FIG. 1, and the component parts of the geothermal energy systems identified with the same reference numerals in both embodiments may be the same and operate in the same manner. The geothermal energy system in FIG. 2A includes a compressor 11 between the condenser 9 and the heat exchanger 2. In order to maximize beat absorption from the primary fluid 1 in the heat exchanger 2, the secondary working fluid 3 conveyed from the condenser 9 may pass through the compressor 11 to increase the pressure of the secondary working fluid 3. In the present disclosure, a compressor is any mechanical device that elevates pressure of a fluid. The compressor 11 may be a pump when the secondary working fluid 3 is in a liquid phase. The increase in pressure may change the secondary working fluid 3 leaving the compressor 11 to a liquid state with high pressure and low temperature. This high pressure, low temperature secondary working fluid 3 may then be conveyed back to the heat exchanger 2 to reabsorb heat provided by the thermal energy from the primary fluid 1 (which is heated by the geothermal energy source). The process of generating electricity 7 from the geothermal energy source described above may then be repeated in a repetitive, cyclic manner to continually generate electricity 7.

The geothermal energy system in FIG. 2A also includes a compressor 10 in connection with the condenser 8. In order to maximize heat absorption from the thermal energy source in the geothermal well 13, the primary fluid 1 may be conveyed from the condenser 8 to the compressor 10 to increase the pressure of the primary fluid 1. The compressor 10 may be a pump when the primary fluid 1 is in a liquid phase. The increase in pressure may change the primary fluid 1 leaving the compressor 10 to a liquid state with high pressure and low temperature. This high pressure, low temperature primary fluid 1 may then be conveyed, back into the well 13 to reabsorb heat provided by the thermal energy source from the geothermal energy source, as discussed above.

The geothermal energy system in FIG. 2A may include the restriction 12 and/or the pump 15 discussed above with respect to FIG. 1, and/or may have a substance added to the primary fluid 1 to increase the density of the primary fluid 1 as discussed above. In such a case, the geothermal energy system in FIG. 2A may be provided with the same benefits derived from the increased pressure of the primary fluid 1 discussed above.

Figure 2B:
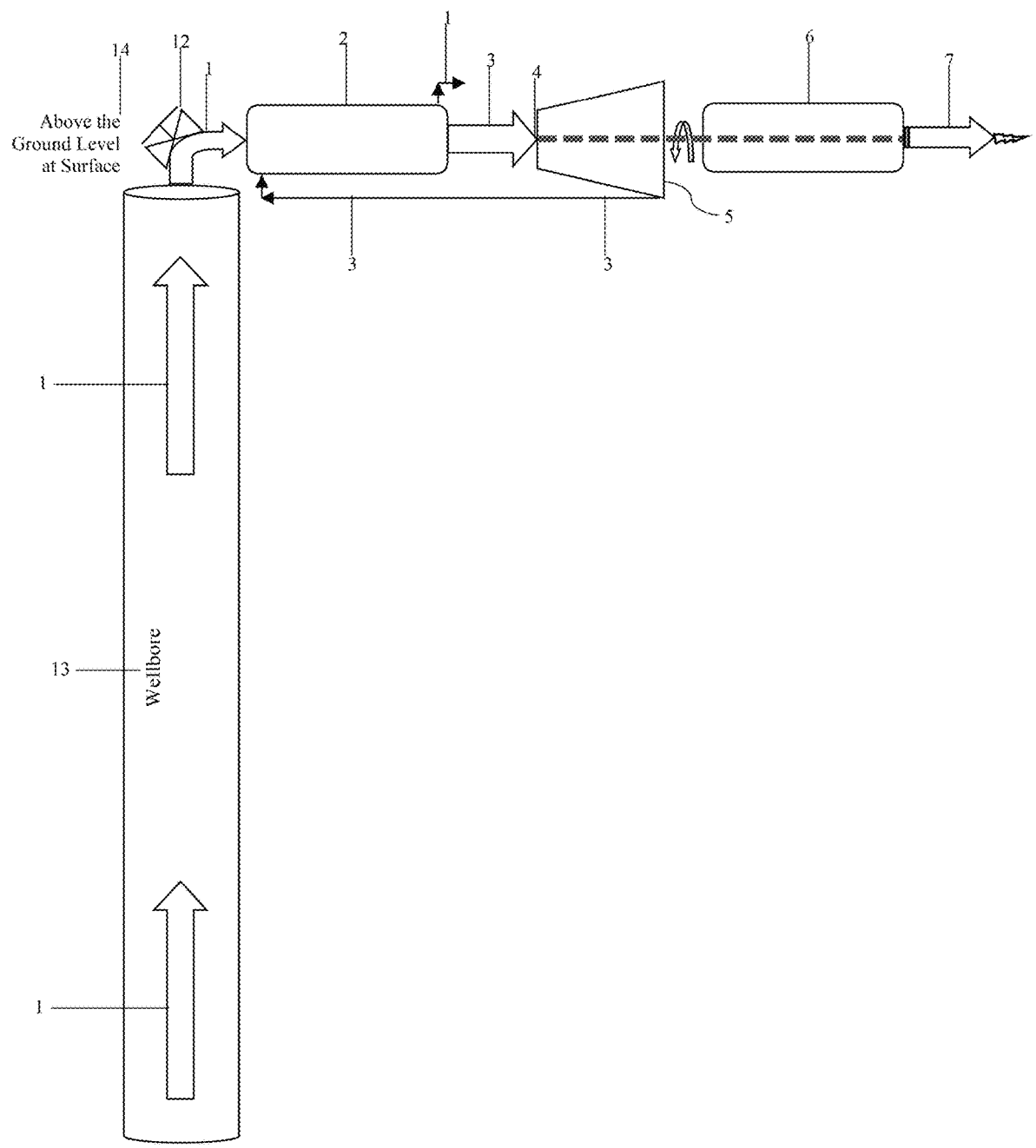
FIG. 2B is a schematic illustration of a geothermal energy system according to a third embodiment.

FIG. 2B illustrates a third embodiment of a geothermal energy system for generating electricity. The geothermal energy system in FIG. 2B is similar to the ones described above with respect to FIGS. 1 and 2A, and the component parts of the geothermal energy systems identified with the same reference numerals in the embodiments may be the same and operate in the same manner. The geothermal energy system in FIG. 2B excludes both the condenser 9 and the compressor 11 that is included in the geothermal energy systems in FIGS. 1 and 2A. Thus, in the geothermal energy system of FIG. 2B, the heated secondary working fluid 3 exiting the turbine 5 is conveyed to the heat exchanger 2 in a low pressure, high temperature state. In the heat exchanger 2, the low pressure/high temperature heated secondary working fluid 3 absorbs thermal energy from the healed primary fluid 1. The heated secondary working fluid 3 may then be conveyed to the turbine 5 to drive the turbine 5 as discussed above. Optionally, the heated secondary working fluid 3 may pass through the nozzle 4 before entering the turbine 5. The geothermal energy system in FIG. 2B also excludes the condenser 8 and the compressor 10 that accommodates the heated primary fluid 1 exiting the heat exchanger 2 in the geothermal energy system of FIGS. 1 and 2A. In this case, the primary fluid 1 exiting the heat exchanger 2 may be conveyed back into the geothermal well 13 without passing through the condenser 8 and the compressor 10, and again absorb thermal energy from the geothermal energy source. The healed primary fluid 1 may then be recirculated through the heat exchanger 2 to exchange the thermal energy with the secondary working fluid 3 in a subsequent thermodynamic cycle. The geothermal energy system in FIG. 2B may include the restriction 12 and/or the pump 15 discussed above with respect to FIG. 1, and/or may have a substance added to the primary fluid 1 to increase the density of the primary fluid 1 as discussed above. In such a case, the geothermal energy system in FIG. 2B may be provided with the same benefits derived from the increased pressure of the primary fluid 1 discussed above.

Figure 2C:
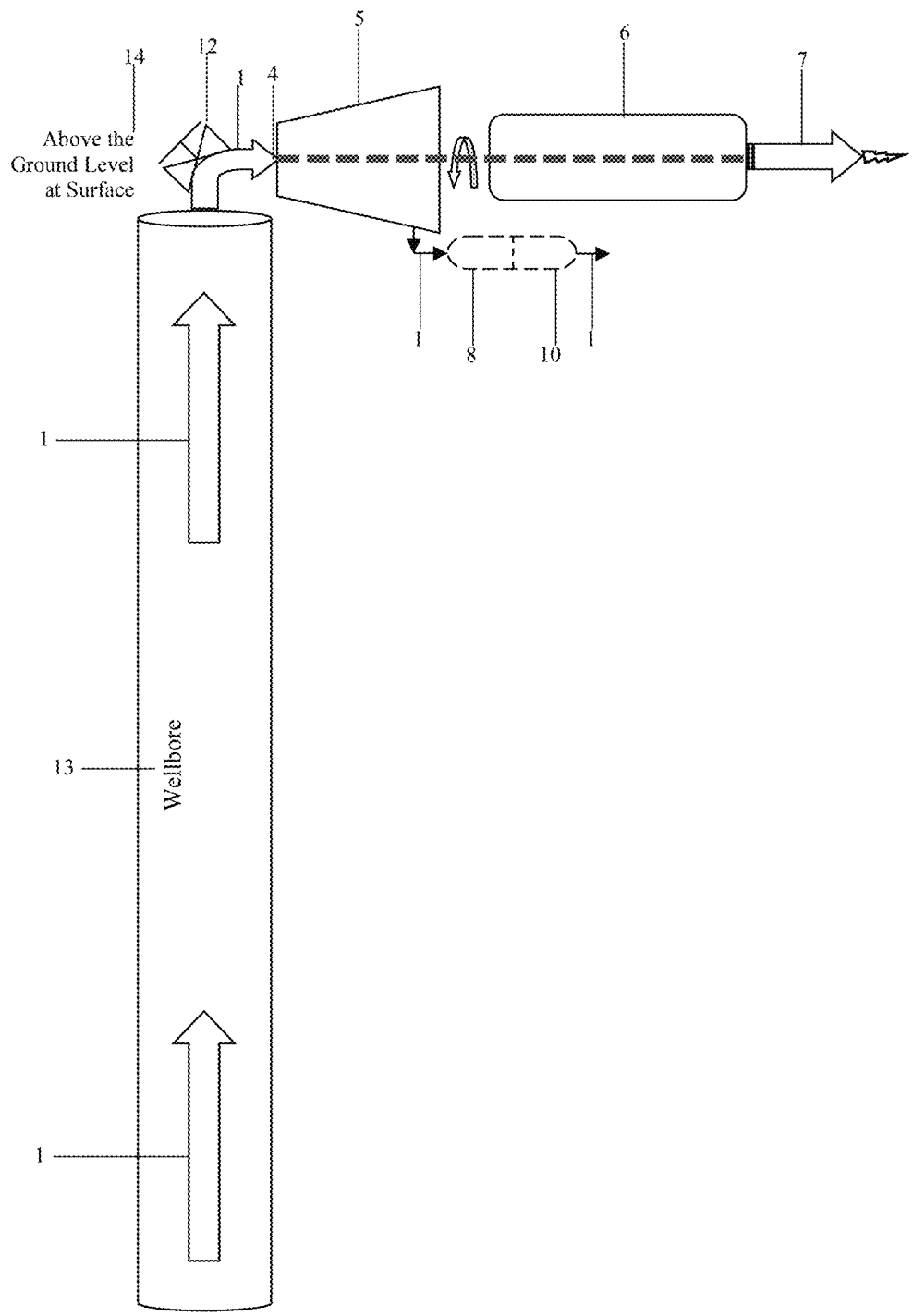
FIG. 2C is a schematic illustration of a geothermal energy system according to a fourth embodiment.

FIG. 2C illustrates a fourth embodiment of a geothermal energy system for generating electricity. The geothermal energy system in this embodiment is a "single fluid" system, as opposed to the "binary" systems in FIGS. 1, 2A and 2B that implement both a primary fluid and a secondary working fluid. In the "single fluid" system of FIG. 2C, the thermodynamic process implemented by the geothermal energy system uses only the primary fluid 1 to drive the turbine 5. The heat exchanger 2 of FIGS. 1, 2A and 2B is thus excluded. Other component parts that are shared by the geothermal energy systems in FIGS. 1 to 2C and identified with the same reference numerals may be the same and operate in the same manner. In the geothermal energy of FIG. 2C, at least some portion of thermal energy from the geothermal energy source is transferred as heat to the primary fluid 1 by heat exchange. The primary fluid 1 absorbs the thermal energy of the geothermal energy source to raise the temperature of the primary fluid 1, as discussed above. As also discussed above, the transferred heat from the geothermal energy source can elevate the kinetic energy of the primary fluid 1 so that the heated primary fluid 1 may have a relatively high temperature and pressure. Upon absorbing the thermal energy (heat) from the geothermal energy source, the primary fluid 1 may increase its, temperature, volume and pressure, and thus its enthalpy, and may change its phase/state from a liquid to a gas/vapor. The primary fluid 1 may also be heated to the extent that it reaches a supercritical state. In some instances, the heated primary fluid 1 may be considered as a kinetic energy fluid by virtue of its molecular movement.

The geothermal energy system in FIG. 2C may include the restriction 12 discussed above located in a flow path of the primary fluid 1 from the geothermal well 13 to the turbine 5. As discussed above, the restriction 12 may be a choke or a valve. The restriction 12 creates a backpressure in the well 13, which in turn increases a pressure on the primary fluid 1. The increase in pressure on the primary fluid 1 raises the boiling point and the temperature of the primary fluid 1. The increased boiling point and temperature of the primary fluid 1 enable the primary fluid 1 to enter the turbine 5 with a higher temperature, which results in more kinetic energy of the primary fluid 1 to do the work that drives the turbine 5. Also, the latent heat of the primary fluid 1 may be decreased by the increased boiling point and temperature of the primary fluid 1. The heat loss due to movement of the primary fluid 1 from the geothermal energy source to the surface 14 of the well 13 should not be more than the latent heat of the primary fluid 1, in order to maintain the higher temperature of the primary fluid 1 entering and driving the turbine 5. As a result, the primary fluid 1 can maximize the kinetic energy for driving the turbine 5, so that turbine 5 can drive the electricity generator 6 faster to increase the amount of electromagnetic induction and generated electricity 7. Increasing a pressure on the primary fluid 1 can thus increase the production and efficiency of the geothermal energy system, The geothermal energy system in FIG. 2C may also include the pump 15 discussed above to pump or increases a pumping pressure of the primary fluid 1 into the geothermal well 13. The pump 15 may be provided in the geothermal system in addition to, or as an alternative to, the restriction 12. As discussed above, increasing the pumping pressure of the primary fluid 1 into the geothermal well 13 increases the backpressure in the well 13 and the pressure of the primary fluid 1. The increase in pressure raises the boiling point and the temperature of the primary fluid 1 as discussed above. The increased boiling point and temperature of the primary fluid 1 enable the primary fluid 1 to enter the turbine 5 with a higher temperature, which results in more kinetic energy of the primary fluid 1 to do the work that drives the turbine 5. Also, the latent heat of the primary fluid 1 may be decreased by the increased boiling point and temperature of the primary fluid 1. The heat loss due to movement of the primary fluid 1 from the geothermal energy source to the surface 14 of the well 13 should not be more than the latent heat of the primary fluid 1, in order to maintain the higher temperature of the primary fluid 1 entering and driving the turbine 5. As a result, the primary fluid 1 can maximize the kinetic energy for driving the turbine 5, so that turbine 5 can drive the electricity generator 6 faster to increase the amount of electromagnetic induction and generated electricity 7, increasing a pressure on the primary fluid 1 can thus increase the production and efficiency of the geothermal energy system as discussed above.

The geothermal energy system in FIG. 2C may also have a substance added to the primary fluid 1 to increase the density of the primary fluid 1 as discussed above. Increasing the density of the primary fluid 1 to increase the pressure of the primary fluid 1 in the geothermal system may be done in addition to, or as an alternative to, the restriction 12 and/or the pump 15. As discussed above, increasing the density of the primary fluid 1 increases the hydrostatic pressure of the primary fluid 1 in the well 13, and hence the system pressure. The increase in pressure raises the boiling point and the temperature of the primary fluid 1. The increased boiling point and temperature of the primary fluid 1 enable the primary fluid 1 to enter the turbine 5 with a higher temperature, which results in more kinetic energy of the primary fluid 1 to do the work that drives the turbine 5. Also, the latent heat of the primary fluid 1 may be decreased by the increased boiling point and temperature of the primary fluid 1. The heat loss due to movement of the primary fluid 1 from the geothermal energy source to the surface 14 of the well 13 should not be more than the latent heat of the primary fluid 1, in order to maintain the higher temperature of the primary fluid 1 entering and driving the turbine 5. As a result, the primary fluid can maximize the kinetic energy for driving the turbine 5, so that turbine 5 can drive the electricity generator 6 faster to increase the amount of electromagnetic induction and generated electricity 7. Increasing a pressure on the primary fluid 1 can thus increase the production and efficiency of the geothermal energy system as discussed above.

In FIG. 2C, the heated primary fluid 1 flows from the well 13 or the restriction 12 to the turbine 5. Optionally, the heated primary fluid 1 may pass through the nozzle 4 before entering the turbine 5. As the heated primary fluid 1, preferably in the supercritical gas state/phase, enters the turbine 5, its kinetic energy will exert a force to move the series of blades on the shaft of the turbine 5 as discussed above. As discussed above, the force turns the blades, which rotates the shaft to drive the turbine 5. The turbine 5, in turn, drives an electricity generator 6 to generate electricity 7 via electromagnetic induction. The electricity 7 produced can be extracted from the electricity generator 6 and sent to an electrical grid for commercial distribution and use. The frequency of the electricity 7 from the electricity generator 6 can be adjusted to the grid-line frequency of the grid to synchronize the transmission, as discussed above.

The pressure of the heated primary fluid 1 after driving the turbine 5 may be reduced, such that the heated primary fluid 1 exiting the turbine 5 is in a low pressure, high temperature state. In this state, the heated primary fluid 1 may be conveyed to the condenser 8 to reduce the temperature of the heated primary fluid 1. Reducing the temperature of the heated primary fluid 1 is beneficial because a lower (cooler) temperature allows the primary fluid 1 to subsequently absorb more heat from the thermal energy of the geothermal energy source, and thus increases the efficiency in reusing the primary fluid 1 in a cyclic thermodynamic process as discussed above. In an embodiment, the condenser 8 exchanges or extracts the heat of the high temperature primary fluid 1 (which may be in a superheated gas/vapor phase) with the ambient temperature of the air in the condenser 8 which causes the primary fluid 1 to cool. Thus, the primary fluid 1 exiting the condenser 8 may have a decreased temperature along with the decreased pressure.

The primary fluid 1 having a decreased temperature and pressure may be conveyed back into the geothermal well 13 to be reheated by the geothermal energy source and used again in the energy generating process. In order to maximize heat absorption from the geothermal energy source, the primary fluid 1 conveyed from the condenser 8 may pass through the compressor 10 to increase the pressure of the primary fluid 1. The increase in pressure may change the primary fluid 1 leaving the compressor 8 to a liquid state with high pressure and low temperature. This high pressure, low temperature primary fluid 1 may then be conveyed hack into the well 13 to reabsorb heat provided by the thermal energy from the geothermal energy source. The process of generating electricity 7 from the geothermal energy source may then be repeated in a repetitive, cyclic manner to generate electricity 7.

Figure 2D:
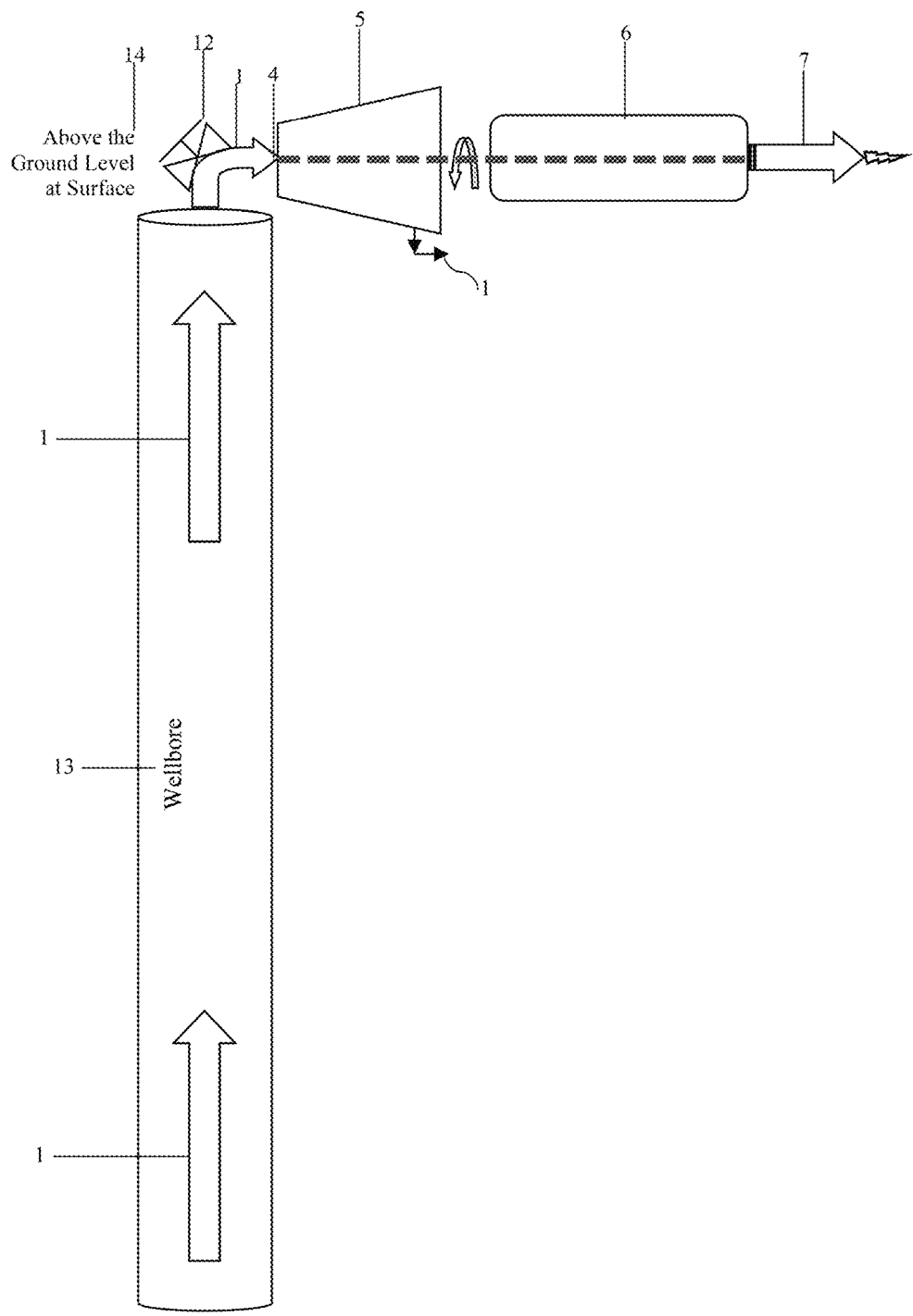
FIG. 2D is a schematic illustration of a geothermal energy system according to a fifth embodiment.

FIG. 2D illustrates a fifth embodiment of a geothermal energy system for generating electricity. The geothermal energy system in FIG. 2D is similar to the one described above with respect to FIG. 2C, and the component parts of the geothermal energy systems identified with the same reference numerals in both embodiments may be the same and operate in the same manner. The geothermal energy system in FIG. 1D excludes the condenser 8 and the compressor 10 that is included in the geothermal power plant in FIG. 2C. Thus, in the geothermal power plant of FIG. 2D, the heated primary fluid 1 exiting the turbine 5 is conveyed to the well in a low pressure, high temperature state without passing through the condenser 8 and the compressor 10. In the well, the low pressure-high temperature heated primary fluid 1 absorbs thermal energy from the geothermal energy source. The pressure of the heated primary fluid 1 may be increased in any of the ways discussed above before being again used to drive the turbine 5. Optionally, the heated primary fluid 1 may pass through the nozzle 4 before entering the turbine 5.

Figure 3:
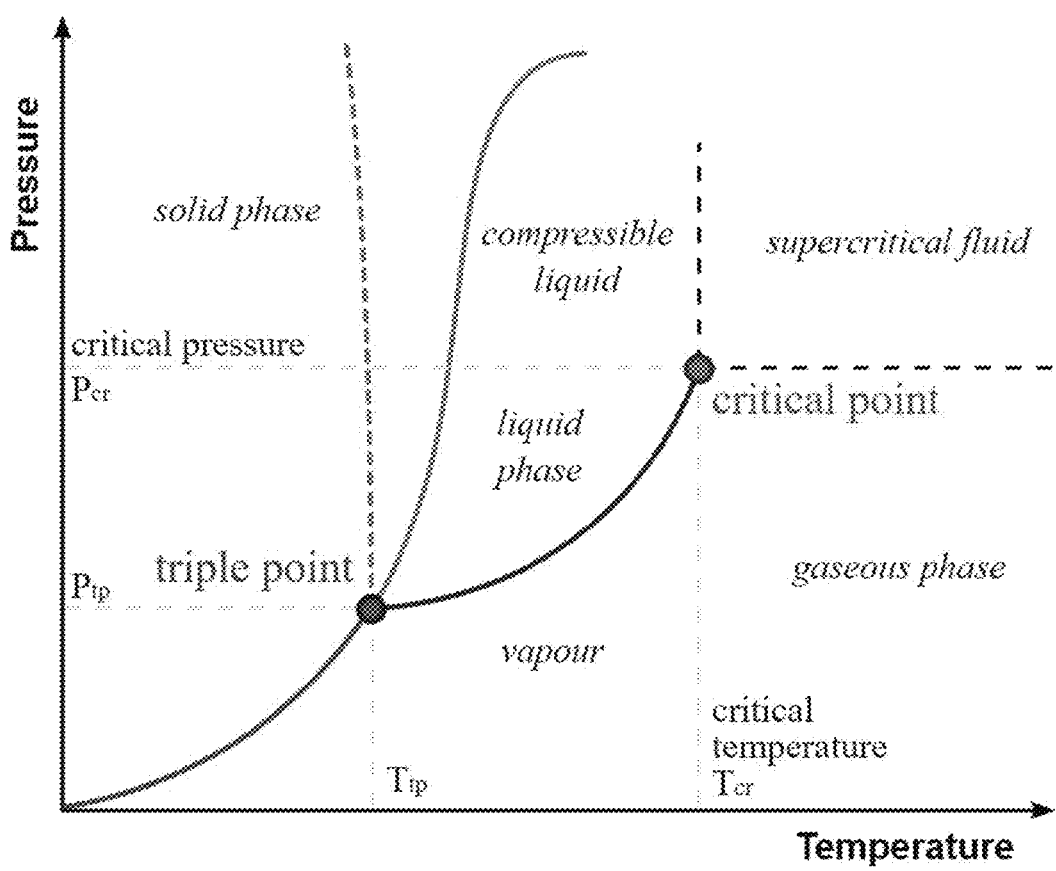
FIG. 3 shows a phase/state diagram for substances, according to an embodiment.

FIG. 3 shows a phase/state diagram for substances, according to an embodiment. In particular, the diagram shows the phase changes of a given substance as pressure (y-axis) and temperature (x-axis) increase. As pressure (y-axis) and temperature (x-axis) increase, the substance may change its phase from a solid ("solid phase") to a liquid ("liquid phase"), and from a liquid to a gas ("gaseous phase"). Upon reaching a critical pressure and a critical temperature (the "critical point"), the substance may change from a gas phase to a supercritical phase. In a "single fluid" thermal energy system, the primary fluid 1 becomes supercritical when the pressure and temperature of the primary fluid 1 reach the critical point. In the "binary" geothermal energy systems discussed herein, the secondary working fluid 3 is preferably in the supercritical phase when driving the turbine 5. However, the secondary working fluid 3 may also be in the gaseous phase when driving the turbine 5. In the "single fluid" geothermal energy systems discussed herein, the primary fluid 1 is preferably in the supercritical phase when driving the turbine 5. However, the primary fluid 1 may also be in the gaseous phase when driving the turbine 5. In the diagram, the curved line from the "triple point" to the "critical point" represents the boiling point of a substance. The curved line above the line representing the boiling point represents the melting point of the substance.

Figure 4:
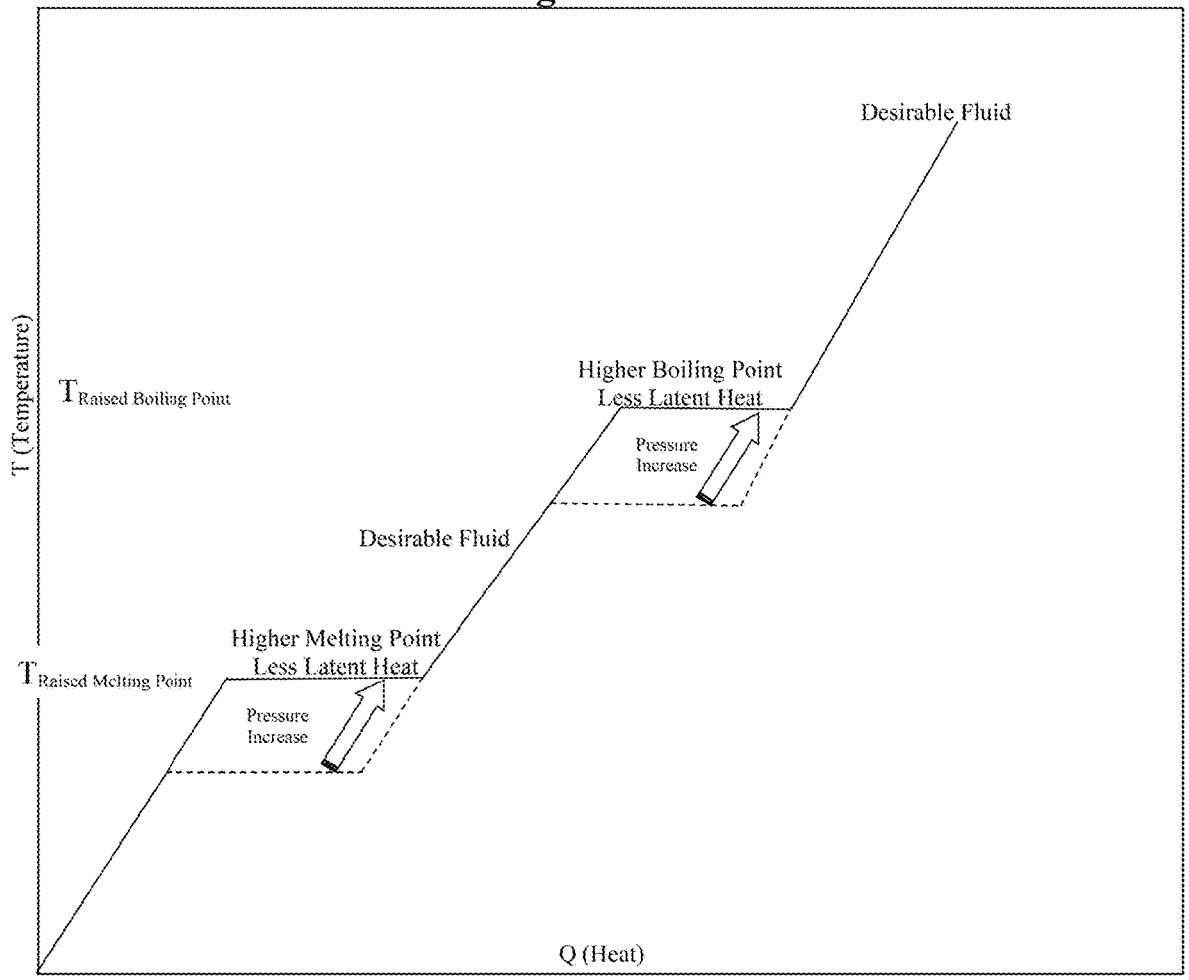
FIG. 4 is a graph showing some thermodynamic characteristics of a primary fluid under increased pressure in a geothermal energy system for generating electricity, according to an embodiment.

FIG. 4 is a graph showing some thermodynamic characteristics of the primary fluid under increased pressure in a geothermal energy system according to an embodiment. The graph compares the melting and boiling points of a primary fluid 1 under increased pressure (solid line) with those of a primary fluid not under the increased pressure (dotted line) with respect to temperature (y-axis) and heat (x-axis) during phase changes. Temperature is a direct measurement of thermal energy. That is, thermal energy is measured through temperature. Accordingly, the higher the temperature of a primary fluid, the more thermal energy the primary fluid has. Heat is the transfer of thermal energy between two substances (e.g., a primary fluid and a secondary working fluid) caused by a difference in temperature. Because heat flows spontaneously from a substance with higher thermal energy to a substance with lower thermal energy, the minimum requirement for heat transfer between substances is the difference between their thermal energies.

As shown in FIG. 4, increasing the pressure the primary fluid 1 (solid line) increases the temperature and boiling point ($T_{Raised\ Boiling\ Point}$ on y-axis) of the primary fluid 1 compared to a primary fluid that is not under the increased pressure (dotted line). In addition, the latent heat (represented by the horizontal lines) of the primary fluid 1 under increased pressure (solid line) is less than the latent heat of a primary fluid that is not under the increased pressure (dotted line). FIG. 4 shows that the horizontal solid line representing the latent heat of the primary fluid 1 under increased pressure is shorter, than the horizontal dotted line of a primary fluid not under the increased pressure. In a "binary" system the role of the primary fluid 1 is to transfer thermal energy from the thermal energy source to the secondary working fluid 3 in tele heat exchanger 2 at the surface 14 with minimum heat loss. Increasing the pressure on the primary fluid 1 as discussed herein increases the temperature and the boiling point of the primary fluid 1 as shown in FIG. 4, so that the primary fluid 1 can transfer more heat to the secondary working fluid 3 in the heat exchanger 2 and increase the kinetic energy of the secondary working fluid 3 used to drive the turbine 5. In the "single fluid" system discussed herein, the primary fluid 1 can enter the turbine 5 with a higher temperature, which results in more kinetic energy of the primary fluid 1 to do the work that drives the turbine 5.

Figure 5:
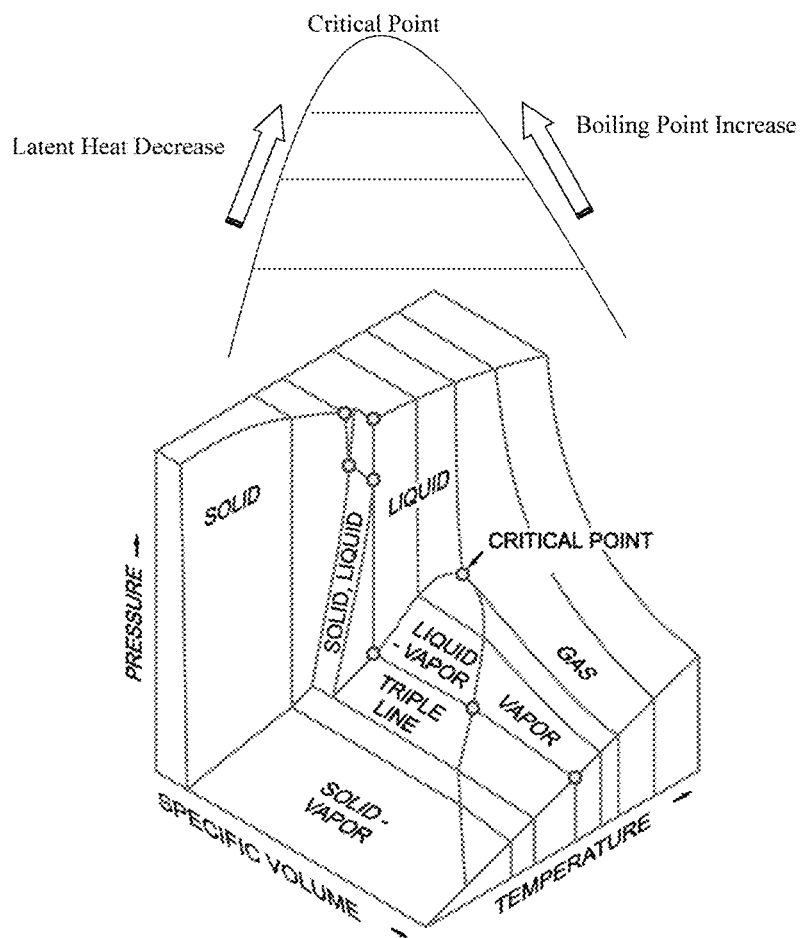
FIG. 5 shows a three dimensional phase-state diagram for substances, according to an embodiment.

FIG. 5 shows a three dimensional phase/state diagram for substances. The diagram shows the phase changes of a given substance with respect to pressure (y-axis), specific volume (x-axis), and temperature (z-axis). The curve along the x-axis forms a thermodynamic envelope having, the critical point of the substance at the apex of the thermodynamic envelope. The latent heat for phase change is represented by horizontal lines along the x-axis. The length of the horizontal lines decrease within the thermodynamic envelope as temperature and pressure rise, as shown in the thermodynamic envelope at the top of FIG. 5. That is, the latent heat of the substance decreases with the increase in temperature, boiling point, and pressure up to the critical point. FIG. 5 thus shows the relationship that when the pressure of the primary fluid 1 in the geothermal energy systems is increased, the temperature and boiling point also rise, which causes the latent heat of the primary fluid 1 to decrease, as discussed above.

Figure 6:
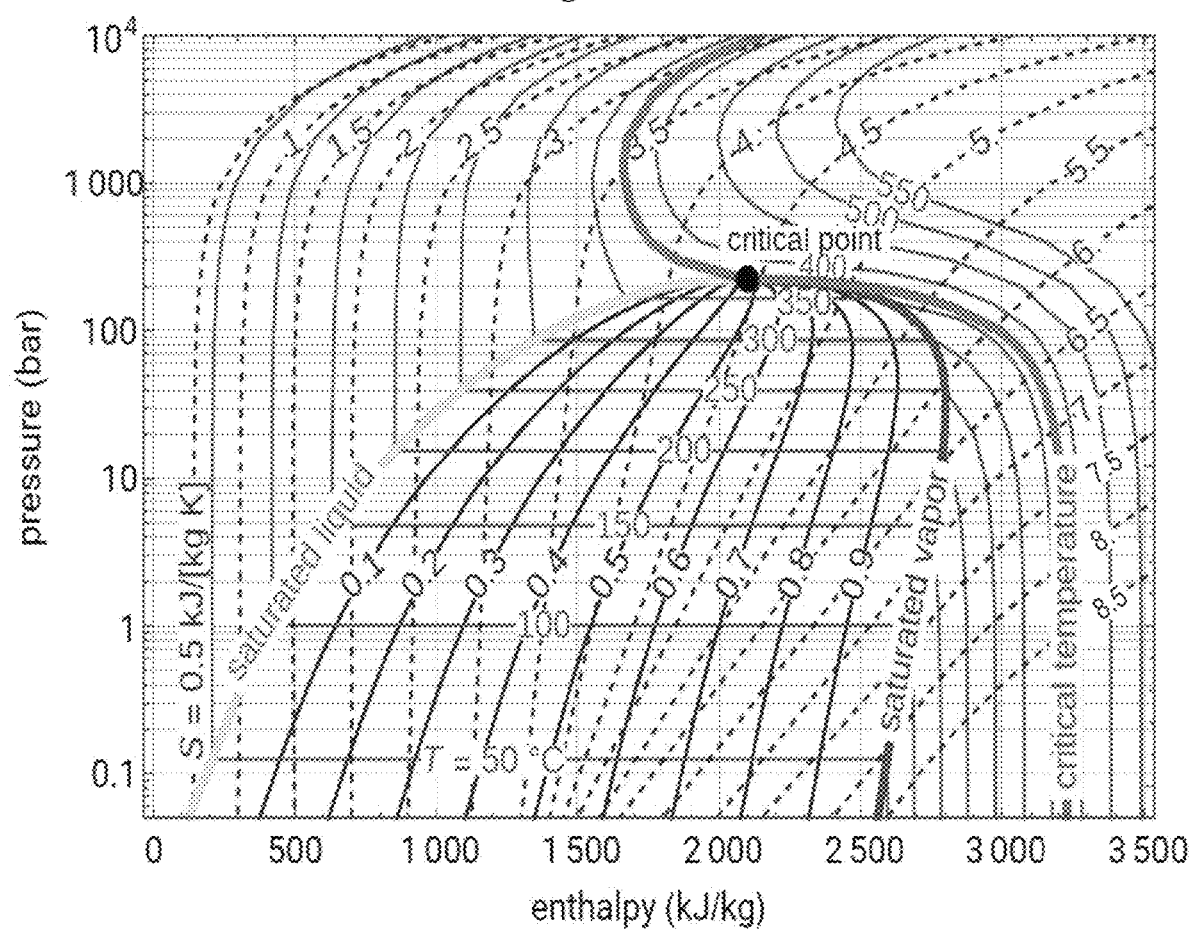
FIG. 6 illustrates a graph of a Rankine Cycle for water showing thermodynamic properties of water.

FIG. 6 is a graph of a Rankine Cycle showing thermodynamic properties of water as a working fluid. The graph shows the critical point for water at the intersection of its saturated liquid curve, saturated vapor curve, and critical temperature curve, with respect to pressure (y-axis) and enthalpy (x-axis). The saturated liquid curve, saturated vapor curve, and critical temperature curve have a shape representing the thermodynamic envelope discussed above.

The following Table shows some properties of water as the pressure on the water is increased from 0.02 bar to 30.0 bar according to calculations performed by the inventor. The Table shows that as the pressure on the water increases, the boiling point, density, specific enthalpy, specific heat and dynamic viscosity increase of the water increase, while the specific volume and latent heat of vaporization of the water decrease.

TABLE I

Some Properties of Water Under Increasing Pressure

| Absolute Pressure (bar) | Boiling Point (° C.) | Specific Volume (kg/m³) | Density steam (kg/m³) | Specific Enthalpy of liquid water (kj/kg) | Specific Enthalpy of Meant (kj/kg) | Latent Heat of Vaporization (kj/kg) | Specific Heat (kj/kg · K)) | Dynamic Viscosity (kg/m.s.) |
|---|---|---|---|---|---|---|---|---|
| 0.02 | 17.51 | 67.006 | 0.015 | 73.45 | 2533.64 | 2460.19 | 1.8644 | 0.00001 |
| 0.03 | 24.1 | 45.667 | 0.022 | 101 | 2545.64 | 2444.65 | 1.8694 | 0.00001 |
| 0.04 | 28.98 | 34.802 | 0.029 | 121.41 | 2554.51 | 2433.21 | 1.8736 | 0.00001 |
| 0.05 | 32.9 | 28.194 | 0.035 | 137.77 | 2561.59 | 2423.82 | 1.8774 | 0.00001 |
| 0.06 | 36.18 | 23.741 | 0.042 | 151.5 | 2567.51 | 2416.01 | 1.8808 | 0.00001 |
| 0.07 | 39.02 | 20.531 | 0.049 | 163.38 | 2572.62 | 2409.24 | 1.884 | 0.00001 |
| 0.08 | 41.53 | 18.105 | 0.055 | 173.87 | 2577.11 | 2403.25 | 1.8871 | 0.00001 |
| 0.09 | 43.79 | 16.204 | 0.062 | 183.28 | 2581.14 | 2397.85 | 1.8899 | 0.00001 |
| 0.1 | 45.83 | 14.675 | 0.068 | 191.84 | 2584.78 | 2392.94 | 1.8927 | 0.00001 |
| 0.2 | 60.09 | 7.65 | 0.131 | 251.46 | 2609.86 | 2358.4 | 1.9156 | 0.000011 |
| 0.3 | 69.13 | 5.229 | 0.191 | 289.31 | 2625.43 | 2336.13 | 1.9343 | 0.000011 |
| 0.4 | 75.89 | 3.993 | 0.25 | 317.65 | 2636.88 | 2319.23 | 1.9506 | 0.000011 |
| 0.5 | 81.35 | 3.24 | 0.309 | 340.57 | 2645.99 | 2305.42 | 1.9654 | 0.000012 |
| 0.6 | 85.95 | 2.732 | 0.366 | 359.93 | 2653.57 | 2293.64 | 1.979 | 0.000012 |
| 0.7 | 89.96 | 2.365 | 0.423 | 376.77 | 2660.07 | 2283.3 | 1.9919 | 0.000012 |
| 0.8 | 93.51 | 2.087 | 0.479 | 391.73 | 2665.77 | 2274.05 | 2.004 | 0.000012 |
| 0.9 | 96.71 | 1.869 | 0.535 | 405.21 | 2670.85 | 2265.65 | 2.0156 | 0.000012 |
| 1 | 99.63 | 1.694 | 0.59 | 417.51 | 2675.43 | 2257.92 | 2.0267 | 0.000012 |
| 1.1 | 102.32 | 1.549 | 0.645 | 428.84 | 2679.61 | 2250.76 | 2.0373 | 0.000012 |
| 1.2 | 104.81 | 1.428 | 0.7 | 439.36 | 2683.44 | 2244.08 | 2.0476 | 0.000012 |
| 1.3 | 107.13 | 1.325 | 0.755 | 449.19 | 2686.98 | 2237.79 | 2.0576 | 0.000013 |
| 1.4 | 109.32 | 1.236 | 0.809 | 458.42 | 2690.28 | 2231.86 | 2.0673 | 0.000013 |
| 1.5 | 111.37 | 1.159 | 0.863 | 467.13 | 2693.36 | 2226.23 | 2.0768 | 0.000013 |
| 1.5 | 111.37 | 1.159 | 0.863 | 467.13 | 2693.36 | 2226.23 | 2.0768 | 0.000013 |
| 1.6 | 113.32 | 1.091 | 0.916 | 475.38 | 2696.25 | 2220.87 | 2.086 | 0.000013 |
| 1.7 | 115.17 | 1.031 | 0.97 | 483.22 | 2698.97 | 2215.75 | 2.095 | 0.000013 |
| 1.8 | 116.93 | 0.977 | 1.023 | 490.7 | 2701.54 | 2210.84 | 2.1037 | 0.000013 |
| 1.9 | 118.62 | 0.929 | 1.076 | 497.85 | 2703.98 | 2206.13 | 2.1124 | 0.000013 |
| 2 | 120.23 | 0.885 | 1.129 | 504.71 | 2706.29 | 2201.59 | 2.1208 | 0.000013 |
| 2.2 | 123.27 | 0.81 | 1.235 | 517.63 | 2710.6 | 2192.98 | 2.1372 | 0.000013 |

TABLE I-continued

Some Properties of Water Under Increasing Pressure

| Absolute Pressure (bar) | Boiling Point (° C.) | Specific Volume (kg/m³) | Density steam (kg/m³) | Specific Enthalpy of liquid water (kj/kg) | Specific Enthalpy of Meant (kj/kg) | Latent Heat of Vaporization (kj/kg) | Specific Heat (kj/kg · K)) | Dynamic Viscosity (kg/m.s.) |
|---|---|---|---|---|---|---|---|---|
| 2.4 | 126.09 | 0.746 | 1.34 | 529.64 | 2714.55 | 2184.91 | 2.1531 | 0.000013 |
| 2.6 | 128.73 | 0.693 | 1.444 | 540.88 | 2718.17 | 2177.3 | 2.1685 | 0.000013 |
| 2.8 | 131.2 | 0.646 | 1.548 | 551.45 | 2721.54 | 2170.08 | 2.1835 | 0.000013 |
| 3 | 133.54 | 0.606 | 1.651 | 561.44 | 2724.66 | 2163.22 | 2.1981 | 0.000013 |
| 3.5 | 138.87 | 0.524 | 1.908 | 584.28 | 2731.63 | 2147.35 | 2.2331 | 0.000014 |
| 4 | 143.63 | 0.462 | 2.163 | 604.68 | 2737.63 | 2132.95 | 2.2664 | 0.000014 |
| 4.5 | 147.92 | 0.414 | 2.417 | 623.17 | 2742.88 | 2119.71 | 2.2983 | 0.000014 |
| 5 | 151.85 | 0.375 | 2.669 | 640.12 | 2747.54 | 2107.42 | 2.3289 | 0.000014 |
| 5.5 | 155.47 | 0.342 | 2.92 | 655.81 | 2751.7 | 2095.9 | 2.3585 | 0.000014 |
| 6 | 158.84 | 0.315 | 3.17 | 670.43 | 2755.46 | 2085.03 | 2.3873 | 0.000014 |
| 6.5 | 161.99 | 0.292 | 3.419 | 684.14 | 2758.87 | 2074.73 | 2.4152 | 0.000014 |
| 7 | 164.96 | 0.273 | 3.667 | 697.07 | 2761.98 | 2064.92 | 2.4424 | 0.000015 |
| 7.5 | 167.76 | 0.255 | 3.915 | 709.3 | 2764.84 | 2055.53 | 2.469 | 0.000015 |
| 8 | 170.42 | 0.24 | 4.162 | 720.94 | 2767.46 | 2046.53 | 2.4951 | 0.000015 |
| 8.5 | 172.94 | 0.227 | 4.409 | 732.03 | 2769.89 | 2037.86 | 2.5206 | 0.000015 |
| 9 | 175.36 | 0.215 | 4.655 | 742.64 | 2772.13 | 2029.49 | 2.5456 | 0.000015 |
| 9.5 | 177.67 | 0.204 | 4.901 | 752.82 | 2774.22 | 2021.4 | 2.5702 | 0.000015 |
| 10 | 179.88 | 0.194 | 5.147 | 762.6 | 2776.16 | 2013.56 | 2.5944 | 0.000015 |
| 11 | 184.06 | 0.177 | 5.638 | 781.11 | 2779.66 | 1998.55 | 2.6418 | 0.000015 |
| 12 | 187.96 | 0.163 | 6.127 | 798.42 | 2782.73 | 1984.31 | 2.6878 | 0.000015 |
| 13 | 191.6 | 0.151 | 6.617 | 814.68 | 2785.42 | 1970.73 | 2.7327 | 0.000015 |
| 14 | 195.04 | 0.141 | 7.106 | 830.05 | 2787.79 | 1957.73 | 2.7767 | 0.000016 |
| 15 | 198.28 | 0.132 | 7.596 | 844.64 | 2789.88 | 1945.24 | 2.8197 | 0.000016 |
| 16 | 201.37 | 0.124 | 8.085 | 858.54 | 2791.73 | 1933.19 | 2.862 | 0.000016 |
| 17 | 204.3 | 0.117 | 8.575 | 871.82 | 2793.37 | 1921.55 | 2.9036 | 0.000016 |
| 18 | 207.11 | 0.11 | 9.064 | 884.55 | 2794.81 | 1910.27 | 2.9445 | 0.000016 |
| 19 | 209.79 | 0.105 | 9.556 | 896.78 | 5796.09 | 1899.31 | 2.9849 | 0.000016 |
| 20 | 212.37 | 0.1 | 10.047 | 908.56 | 2797.21 | 1888.65 | 3.0248 | 0.000016 |
| 21 | 214.85 | 0.095 | 10.539 | 919.93 | 2798.18 | 1878.25 | 3.0643 | 0.000016 |
| 22 | 217.24 | 0.091 | 11.032 | 930.92 | 2799.03 | 1868.11 | 3.1034 | 0.000016 |
| 23 | 219.55 | 0.087 | 11.525 | 941.57 | 2799.77 | 1858.2 | 3.1421 | 0.000016 |
| 24 | 221.78 | 0.083 | 12.02 | 951.9 | 2800.39 | 1848.49 | 3.1805 | 0.000017 |
| 25 | 223.94 | 0.08 | 12.515 | 961.93 | 2800.91 | 1838.98 | 3.2187 | 0.000017 |
| 26 | 226.03 | 0.077 | 13.012 | 971.69 | 2801.35 | 1829.66 | 3.2567 | 0.000017 |
| 27 | 228.06 | 0.074 | 13.509 | 981.19 | 2801.69 | 1820.5 | 3.2944 | 0.000017 |
| 28 | 230.04 | 0.071 | 14.008 | 990.46 | 2801.96 | 1811.5 | 3.332 | 0.000017 |
| 29 | 231.96 | 0.069 | 14.508 | 999.5 | 2802.15 | 1802.65 | 3.3695 | 0.000017 |
| 30 | 233.84 | 0.067 | 15.009 | 1008.33 | 2802.27 | 1793.94 | 3.4069 | 0.000017 |

The foregoing geothermal systems for generating electricity may be utilized in processes of generating electricity. These processes may include heating a primary fluid 1 by absorbing thermal energy from a geothermal energy source to elevate thermal energy and kinetic energy of the primary fluid 1 as, discussed herein; increasing a pressure on the primary fluid 1 to raise a boiling point and a temperature of the primary fluid 1 and decrease latent heat of the primary fluid 1 as discussed herein; driving a mechanical device 5 via one of: the kinetic energy of the primary fluid 1 and a kinetic energy of a secondary working fluid 3 that absorbs the thermal energy of the primary fluid 1 in a heat exchanger 2 as discussed herein; and driving an electricity generator 6 by the mechanical device 5 to generate electricity 7 as discussed herein.

In the processes, the pressure on the primary fluid. I may be increased by restricting 12 a floss path of the primary fluid 1 to create a backpressure ire the geothermal well 13 as discussed herein. The restricting 12 may be caused by one of a choke and a valve as discussed herein. In addition or in the alternative, the pressure on the primary fluid 1 may be increased by increasing a density of the primary fluid 1 as discussed herein. Increasing the density of the primary fluid 1 increases hydrostatic pressure of the primary fluid 1 as discussed herein. The density of the primary fluid 1 may be increased by adding a substance to the primary fluid 1 as discussed herein. The substance may be a weighting additive including at least one of: Barite, Hematite, Ilmenite, and MICROMAX (trimanganese tetroxide) as discussed herein. In addition or in the alternative, the pressure on the primary fluid 1 may be increased by increasing a pumping pressure of the primary fluid 1 into the geothermal well 13 as discussed herein. Further, one of the primary fluid 1 arid the secondary working fluid 3 may be in a supercritical state when driving the mechanical device 5 as discussed herein.

It is within the scope of the present disclosure that the above processes and systems of generating electricity may implement any combinations of the components of the processes and systems as discussed herein, and may include operation of the processes and systems discussed herein and any combinations of the components of the processes and the systems as discussed herein.

The present disclosure discusses geothermal energy processes and systems that manipulate the thermodynamic conditions, in a geothermal well by increasing the pressure on the primary fluid 1 as compared to conventional systems. Increasing the pressure of the primary fluid 1 raises the temperature and boiling point of the primary fluid 1, which causes the primary fluid 1 in a "binary" geothermal energy system to enter the heat exchanger 2 with higher temperature. The higher temperature results in more heat transfer to a secondary working fluid 3 in the heat exchanger 2 to raise the temperature and kinetic energy of the secondary working fluid 3 that is used as work to run the turbine 5 that drives the electricity generator 6. In "single fluid" geothermal energy system, the increased temperature and the boiling point of the primary fluid 1 caused by increasing the pressure on the primary fluid 1 provides the primary fluid 1 with more kinetic energy to do the work that drives the turbine 5. In addition, the raised temperature and boiling point reduce the latent heat of the primary fluid 1. As a result, the primary fluid 1 can maximize heat transfer to the secondary working fluid 3 in the heat exchanger 2 ("binary" system) or to the turbine ("single fluid" system). More heat transfer increases the kinetic energy used to drive the turbine 5 and thus the electricity generator 6 to increase the amount of generated electricity 7. Increasing a pressure on the primary fluid 1 can thus increase the production and efficiency of the geothermal energy system.

It should be understood that the foregoing description provides embodiments of the present invention which can be varied and combined without departing from the spirit of this disclosure. Although several embodiments have been illustrated in the accompanying drawings and describe in the foregoing specification, it will be understood by those of skill in the art that additional embodiments, modifications and alterations may be constructed from the principles disclosed herein. Those skilled in the art should, in light of the present disclosure, appreciate that many changes can be made in the specific embodiments which are disclosed and still obtain a like or similar result without departing from the concept, spirit and scope of the present disclosure.

What is claimed is:

1. A geothermal process for generating electricity, comprising:
   heating a flowing primary working fluid flowing through a geothermal well of a closed loop geothermal system by absorbing thermal energy from a subsurface geothermal energy source to increase temperature of the flowing primary working fluid and thereby increase thermal energy and kinetic energy of the flowing primary working fluid;
   decreasing latent heat, increasing boiling point, and further increasing temperature of the flowing primary working fluid flowing through the geothermal well to thereby inhibit or reduce an amount of phase change of the flowing primary working fluid flowing through the geothermal well by restricting a flow path of the flowing primary working fluid flowing out of the geothermal well to thereby increase pressure of the flowing primary working fluid flowing through the geothermal well;
   driving a mechanical device via one of: the kinetic energy of the flowing primary working fluid; and a kinetic energy of a secondary working fluid that absorbs the thermal energy of the flowing primary working fluid in a heat exchanger; and
   driving an electricity generator by the mechanical device to generate electricity.

2. The geothermal process according to claim 1, wherein the restricting of the flow path is caused by at least one of a choke, a valve, and flow path area reducer.

3. The geothermal process according to claim 1, wherein the pressure of the flowing primary working fluid flowing through the geothermal well is further increased by increasing a density of the flowing primary working fluid to thereby increase hydrostatic pressure of the flowing primary working fluid within the geothermal well.

4. The geothermal process according to claim 3, wherein increasing the density of the flowing primary working fluid is performed by adding a substance to the flowing primary working fluid.

5. The geothermal process according to claim 4, wherein the substance is a weighting additive including at least one of: Barite, Hematite, Ilmenite, and trimanganese tetroxide.

6. The geothermal process for according to claim 1, wherein the pressure of the flowing primary working fluid flowing through the geothermal well is further increased by increasing a pumping pressure of the flowing primary working fluid flowing into the geothermal well.

7. The geothermal process according to claim 1, wherein one of the flowing primary working fluid and the secondary working fluid is in a supercritical state when driving the mechanical device.

8. A closed loop geothermal system for generating electricity comprising:
   a geothermal well constructed through a subsurface geothermal energy source;
   a pump operable to flow a primary working fluid along the geothermal well such that the primary working fluid absorbs thermal energy from the subsurface geothermal energy source to increase temperature of the primary working fluid and thereby increase thermal energy and kinetic energy of the primary working fluid;
   a flow restriction device operable to restrict a flow path of the primary working fluid flowing out of the geothermal well;
   a mechanical device that is driven by one of: the kinetic energy of the primary working fluid; and a kinetic energy of a secondary working fluid that absorbs the thermal energy of the primary working fluid in a heat exchanger; and
   an electricity generator that is driven by the mechanical device to generate electricity,
   wherein the flow restriction device is further operable to increase pressure of the primary working fluid flowing through the geothermal well to thereby decrease latent heat, increase boiling point, and further increase the temperature of the primary working fluid flowing through the geothermal well and thereby inhibit or reduce an amount of phase change of the primary working fluid flowing through the geothermal well by increasing the restriction of the flow path of the primary working fluid flowing out of the geothermal well.

9. The geothermal system according to claim 8, wherein the flow restriction device comprises at least one of a choke, a valve, and flow path area reducer.

10. The geothermal system according to claim 8, further comprising a substance added to the primary working fluid to increase a density of the primary working fluid to thereby increase a hydrostatic pressure of the primary working fluid flowing within the geothermal well.

11. The geothermal system according to claim 8, wherein one of the primary working fluid and the secondary working fluid is in a supercritical state when driving the mechanical device.

12. The geothermal process according to claim 1, wherein restricting the flow path of the flowing primary working fluid flowing out of the geothermal well to thereby increase pressure of the flowing primary working fluid flowing through the geothermal well increases enthalpy and. entropy of the flowing primary working fluid flowing through the geothermal well.

13. The geothermal process according to claim 1, further comprising detecting a thermodynamic property of the flowing primary working fluid flowing through the geothermal well, wherein the thermodynamic property comprises at least one of pressure, temperature, and flow rate, and wherein restricting the flow path of the flowing primary working fluid flowing out of the geothermal well to thereby increase pressure of the flowing primary working fluid flowing through the geothermal well is performed based on the detected thermodynamic property of the flowing primary working fluid.

14. The geothermal process according to claim 13, further comprising setting a desired thermodynamic property of the flowing primary working fluid flowing through the geothermal well, wherein restricting the flow path of the flowing primary working fluid flowing out of the geothermal well to thereby increase pressure of the flowing primary working fluid flowing through the geothermal well is performed until the detected thermodynamic property of the flowing primary working fluid reaches the desired thermodynamic property of the flowing primary working fluid.

15. The geothermal system according to claim 8 further comprising a sensor for detecting a thermodynamic property of the primary working fluid flowing through the geothermal well, wherein the thermodynamic property comprises at least one of pressure, temperature, and flow rate, and wherein the flow restriction device is operable to increase the restriction of the flow path of the primary working fluid flowing out of the geothermal well based on the detected thermodynamic property.

16. The geothermal system according to claim 8, wherein increasing the pressure of the primary working fluid flowing through the geothermal well increases enthalpy and entropy of the primary working fluid flowing through the geothermal well.

17. The geothermal system according to claim 8, wherein the pump is further operable to increase the pressure of the primary working fluid flowing through the geothermal well to thereby decrease the latent heat, increase the boiling point, and further increase the temperature of the primary working fluid flowing through the geothermal well and thereby inhibit or reduce the amount of phase change of the primary working fluid flowing through the geothermal well by increasing a pumping pressure that the pump outputs to the primary working fluid flowing into the geothermal well.

18. A geothermal process for generating electricity, comprising:
 operating a pump to flow a primary working fluid through a closed loop geothermal system comprising a geothermal well constructed through a subsurface geothermal energy source to cause the primary working fluid to absorb thermal energy from the subsurface geothermal energy source to increase thermal energy and kinetic energy of the primary working fluid;
 detecting a thermodynamic property of the primary working fluid flowing through the closed loop geothermal system, wherein the thermodynamic property comprises at least one of pressure, temperature, and flow rate;
 controlling boiling point and latent heat of the primary working fluid flowing through the geothermal well by controlling pressure of the primary working fluid flowing through the geothermal well to thereby control an amount of phase change of the primary working fluid flowing through the geothermal well based on the detected thermodynamic property by:
  controlling a pumping pressure that the pump outputs to the primary working fluid flowing into the geothermal well; and
  controlling a flow restriction of the primary working fluid flowing out of the geothermal well;
 driving a mechanical device via one of the kinetic energy of the primary working fluid and a kinetic energy of a secondary working fluid that absorbs the thermal energy from the primary working fluid in a heat exchanger; and
 driving an electricity generator by the mechanical device to generate electricity.

19. The geothermal process according to claim 18, wherein:
 controlling the boiling point and the latent heat of the primary working fluid flowing through the geothermal well comprises increasing the boiling point and the latent heat of the primary working fluid flowing through the geothermal well;
 controlling the pressure of the primary working fluid flowing through the geothermal well comprises increasing the pressure of the primary working fluid flowing through the geothermal well;
 controlling the amount of phase change of the primary working fluid flowing through the geothermal well comprises inhibiting or reducing the amount of phase change of the primary working fluid flowing through the geothermal well;
 controlling the pumping pressure that the pump outputs to the primary working fluid flowing into the geothermal well comprises increasing the pumping pressure that the pump outputs to the primary working fluid flowing into the geothermal well; and
 controlling the flow restriction of the primary working fluid flowing out of the geothermal well comprises increasing the flow restriction of the primary working fluid flowing out of the geothermal well the amount.

20. The geothermal process according to claim 19, wherein increasing the pressure of the primary working fluid flowing through the geothermal well increases enthalpy and entropy of the primary working fluid flowing through the geothermal well.

* * * * *